(12) United States Patent
Serghi et al.

(10) Patent No.: US 7,483,438 B2
(45) Date of Patent: Jan. 27, 2009

(54) SYSTEMS AND METHODS FOR MANAGING NETWORK SERVICES BETWEEN PRIVATE NETWORKS

(75) Inventors: Laura Mihaela Serghi, Ottawa (CA); Brian McBride, Stittsville (CA); Bashar Said Bou-Diab, Ottawa (CA)

(73) Assignee: Alcatel Lucent, Paris (FR)

( * ) Notice: Subject to any disclaimer, the term of this patent is extended or adjusted under 35 U.S.C. 154(b) by 627 days.

(21) Appl. No.: 11/105,821

(22) Filed: Apr. 14, 2005

(65) Prior Publication Data

US 2006/0233180 A1  Oct. 19, 2006

(51) Int. Cl.
*H04L 12/28* (2006.01)
(52) U.S. Cl. .................. 370/401; 370/352; 726/2; 709/229
(58) Field of Classification Search ............ None
See application file for complete search history.

(56) References Cited

U.S. PATENT DOCUMENTS 7,062,565 B1 *  6/2006  Ravindranath et al. ...... 709/229

2003/0061404 A1 *  3/2003  Atwal et al. ............... 709/328
2004/0167984 A1 *  8/2004  Herrmann .................. 709/229
2005/0080873 A1 *  4/2005  Joseph ...................... 709/217

FOREIGN PATENT DOCUMENTS

WO   WO 03/021978 A1   3/2003

OTHER PUBLICATIONS

Stefan Berger. "Towards Pluggable Discovery Frameworks for Mobile and Pervasive Applications". Proceedings of the 2004 IEEE Internat'l. Conference on Mobile Data Management (MDM '04). Berkeley, California, USA. Jan. 19-22, 2004, Los Alamitos, California, USA, IEEE Computer Society. US. Jan. 19, 2004, pp. 308-319. XP010681070. ISBN: 0-7695-2070-7.

* cited by examiner

*Primary Examiner*—Duc C Ho

(57) ABSTRACT

Systems and methods for managing network services between private networks are disclosed. Advertisement of network services which are available in a services network is controlled in accordance with a policy associated with each network service. Network service information is advertised to an external services network only for those network services which have associated policies permitting distribution of the network services through external networks. External network services may also or instead be advertised to a services network from one or more external services networks and subsequently made available in the services network.

25 Claims, 6 Drawing Sheets

SYSTEMS AND METHODS FOR MANAGING NETWORK SERVICES BETWEEN PRIVATE NETWORKS

CROSS-REFERENCE TO RELATED APPLICATIONS

The present application is related to and commonly assigned U.S. patent application Ser. No. 11/105,732 entitled "NETWORK SERVICES INFRASTRUCTURE SYSTEMS AND METHODS", and Ser. No. 11/105,601 entitled "PUBLIC AND PRIVATE NETWORK SERVICE MANAGEMENT SYSTEMS AND METHODS", both filed of even date herewith. The entire contents of both of these applications are incorporated herein by reference.

FIELD OF THE INVENTION

This invention relates generally to network services and, in particular, to management of network services between private networks.

BACKGROUND

Services for which information is distributed through a communication network are generally referred to as network services. So-called "web services" are an example of network services, and represent the next generation of web-based technology being used for automatically exchanging information between different applications over the public Internet network.

Web services are the framework for building web-based distributed applications over the Internet. They provide efficient and effective automated machine to machine communication between multiple global enterprises. This automation is bringing technology based process and business efficiencies from technology companies to world leading non-technology companies such as retail companies. Whereas purchase orders might cost $120 to process using conventional processing techniques, with suppliers taking days to process restocking orders that sit in warehouses, new web services-based systems can do the same for half a cent, and orders are distributed to warehouses across the globe in seconds.

From the technology point of view, web services are similar to application services, in the sense that they are network accessible functions that can be accessed using standard Internet protocols such as HyperText Transfer Protocol (HTTP), extensible Markup Language (XML), Simple Object Access Protocol (SOAP), etc., over standard interfaces.

Web services applications are built with pieces of code and data that may come from anywhere in the public Internet. For example, in automated supply chain management, store front purchases are cleared by monetary agents, restocking orders are sent directly to the factories, and billing information is collected by head offices, each with their own software systems.

The real power of web services technology is in its simplicity. The core technology only addresses the common language and communication issues and does not directly address the onerous task of application integration. Web services can be viewed as a sophisticated machine to machine Remote Procedure Call (RPC) technology for interconnecting multiple heterogeneous untrusted systems. Web services takes the best of many new technologies by utilizing XML technology for data conversion/transparency and Internet standards such as HyperText Transfer Protocol (HTPP) for communication.

Web services have already proven themselves successful in the enterprise private network space, gaining rapid acceptance as the standard way for applications to communicate. Most current web services, however, are hosted by application servers which are located behind firewalls in corporate enterprise networks.

Efforts to support web services interactions within and beyond the enterprise space over the basic Internet infrastructure have concentrated on ad-hoc approaches. According to one approach, different enterprises between which web services were to be offered had to agree on using compatible applications, common proprietary software, custom interfaces and APIs, and common communication protocols. Enterprises also had to agree on data security and the way any secure communications were to be managed. In addition, each enterprise had to open their internal firewalls to let business traffic flow between applications in a point-to-point manner.

Adding new web services business partners in an enterprise environment has always been a difficult, expensive, and time consuming process, since potential new business partners tend to have different sets of rules and standards. Modifications to a new partner's applications and custom code revisions to the enterprise offering the new applications are often required.

There are currently no known deployment and management solutions for deploying and managing an end-to-end virtual (private) extranet web service architecture, targeting a communication network provider's space as opposed to enterprise space. For example, although XML Virtual Private Network (VPN) devices exist, these devices are intended for implementation in enterprise networks behind firewalls.

There are also no existing network service delivery solutions for providing end-to-end network services across network providers' boundaries while protecting all systems involved in a network service-related business transaction.

Existing software-based security products which address the provider's core market, or smaller-capacity hardware-based enterprise class products, do not scale to core network requirements, where a large number of enterprises with various policy/security/admission control requirements might wish to provide or consume web services through the same core network. Enterprise-class products, including server-based architectures and hardware XML devices, also do not typically satisfy the high availability and speed requirements of communication network core equipment.

SUMMARY OF THE INVENTION

Embodiments of the present invention provide a new network element which links private services networks. Network services, illustratively web services, provided by clients of each services network are available within that services network, and in accordance with an embodiment of the invention, network services available in one services network may be offered in, and consumed by clients of, another services network.

In some embodiments, this new network element provides a gateway between a private extranet service architectures. Each extranet architecture is in effect a "network of services" offered to a closed group of members while being administered by a network service provider. The extranet service model is preferably an application layer solution, an overlay network built on top of a network provider's infrastructure.

An aspect of the invention provides an apparatus for managing network services in a private services network. The apparatus includes a proxy module which is configured to receive network service information for a network service which is available in the services network and has an associated network service access policy specifying a permitted access level for distribution of the network service in external networks, and to control advertisement of the network service information to an external services network in accordance with the network service access policy associated with the network service.

The access policy may be a service policy stored in a service policies registry of the private services network.

In some embodiments, the proxy module is further configured to receive, from an external services network, network service information associated with an external network service available in the external services network, and to make the external network service available in the services network. The external network service may be made available in the services network by publishing the external network service in a services registry of the services network, for example. The services registry may be configured to store information associated with both internal network services available in the services network and external network services available from the external services network.

Where the network service information associated with the external network service includes access information specifying access rules for controlling access to the external network service, the proxy module makes the external network service available in the services network in accordance with the access rules.

A services network may include a network controller, and in this case the proxy module may be a network controller proxy module configured to receive the network service information from a network services advertisement module of the network controller. The proxy module mediates advertisement of a network service description for the network service between the advertisement module of the network controller and the external services network.

Service information associated with an external network service available in an external services network may also be received by the proxy module and forwarded to the services network, and in particular to the network controller for instance.

The apparatus may also include any or all of a policy enforcement module configured to enforce policies of the services network, a security module configured to provide secure communication between the services network and the external services network, and within the services network, a forwarding module configured to forward communication traffic from the services network to the external services network, a Simple Object Access Protocol (SOAP) proxy module configured to adapt service messages associated with network services between addressing schemes of the services network and the external services network, a service handling module configured to handle network service messages, associated with network services, from both the services network and the external services network, and a data collector module for collecting logs of transactions between the services network and the external services network.

The SOAP proxy module may also classify traffic associated with network services as control traffic or data traffic, transmit control traffic, including the received network service information, to the proxy module for transfer to the external services network, and modify SOAP information in data traffic for further processing.

The apparatus may be implemented, for example, in a services network gateway which is operatively coupled to the services network and to the external services network. A system for managing network services of a private services network may include one or more services network gateways, each operatively coupled to the services network and to a respective external services network. At least one network controller may also be provided in such a system, with the at least one network controller including a designated network controller operatively coupled to the at least one services network gateway for managing network service access policies associated with network services available in the services network and a registry of network services available in the services network.

According to one embodiment, the designated network controller includes a network services advertisement module configured to identify network services which are available in the services network and have associated network service access policies permitting distribution of the network services in external networks, and to generate advertisement information comprising network service information associated with the identified network services.

Each external services network may include a services registry into which network services advertised to the external services network from the services network are published.

The proxy module of each services network gateway may be further configured to receive from the external services network to which it is operatively coupled, network service information associated with external network services available in the external services network, and to make the external network services available in the services network.

Other gateways may also be provided in a services network and operatively coupled a network controller, which may be the designated network or another network controller where a services network includes more than one network controller. A client gateway, for example, provides an access point to the services network for client of the services network. The network controller to which a client gateway is operatively coupled manages policies to be enforced by the client gateway for controlling client access to network services.

A public network gateway provides an access point to the services network for a client of the services network through the public network, an access point to network services in the public network for a client of the services network, or both. For a public network gateway, a network controller manages policies to be enforced by the public network gateway for controlling client access to the external services network and network services through the public network.

An external services network may have a substantially similar structure.

An apparatus for managing network services in a private services network, according to another aspect of the invention, includes a proxy module which is configured to receive, from an external services network, network service information associated with an external network service available in the external services network, and to make the external network service available in the services network.

This apparatus may be provided, for example, in a services network gateway which is operatively coupled to the services network and the external services network. A network controller of the services network may also be provided to manage a registry of internal network services available in the services network and external network services available in the external services network for which information is received by the services network gateway.

There is also provided, in accordance with a further aspect of the invention, an apparatus which includes a gateway interface and a network service advertisement module. The gateway interface is to be operatively coupled to a services network gateway which is configured to exchange communication traffic between a services network and an external services network. The network service advertisement module is operatively coupled to a services registry and to the gateway interface, and is configured to receive from the services network gateway through the gateway interface external network service information associated with a network service available in the external services network, to publish the external network service to the services registry, to identify an internal network service which is available in the services network and has an associated network service access policy permitting distribution of the network service in the external services network, and to generate and forward to the services network gateway through the gateway interface advertisement information associated with the identified internal network service, the advertisement information including information for advertising the identified internal network service to the external services network.

The apparatus of this aspect of the invention is preferably provided in a network controller of the services network.

A method of managing network services between private services networks is also provided, and includes operations of identifying a network service available in a services network, the network service having an associated network service access policy specifying a permitted access level of the network service, advertising the identified network service to an external services network where the network service access policy associated with the identified network service allows access to the identified network service from the external services network, receiving, from an external services network, network service information associated with an external network service available in the external services network, and making the external network service available in the services network.

The access policy may be stored as a service policy in a service policies registry of the services network, and in this case, the method may also include an operation of accessing the network service access policy associated with the identified network service in the service policies registry.

The operation of making the external network service available in the services network may include publishing the external network service in a services registry of the services network.

In some embodiments, the operation of identifying involves accessing a services registry of the services network to identify an internal network service available in the services network, and the operation of making the external service available involves publishing the external network service in the services registry.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
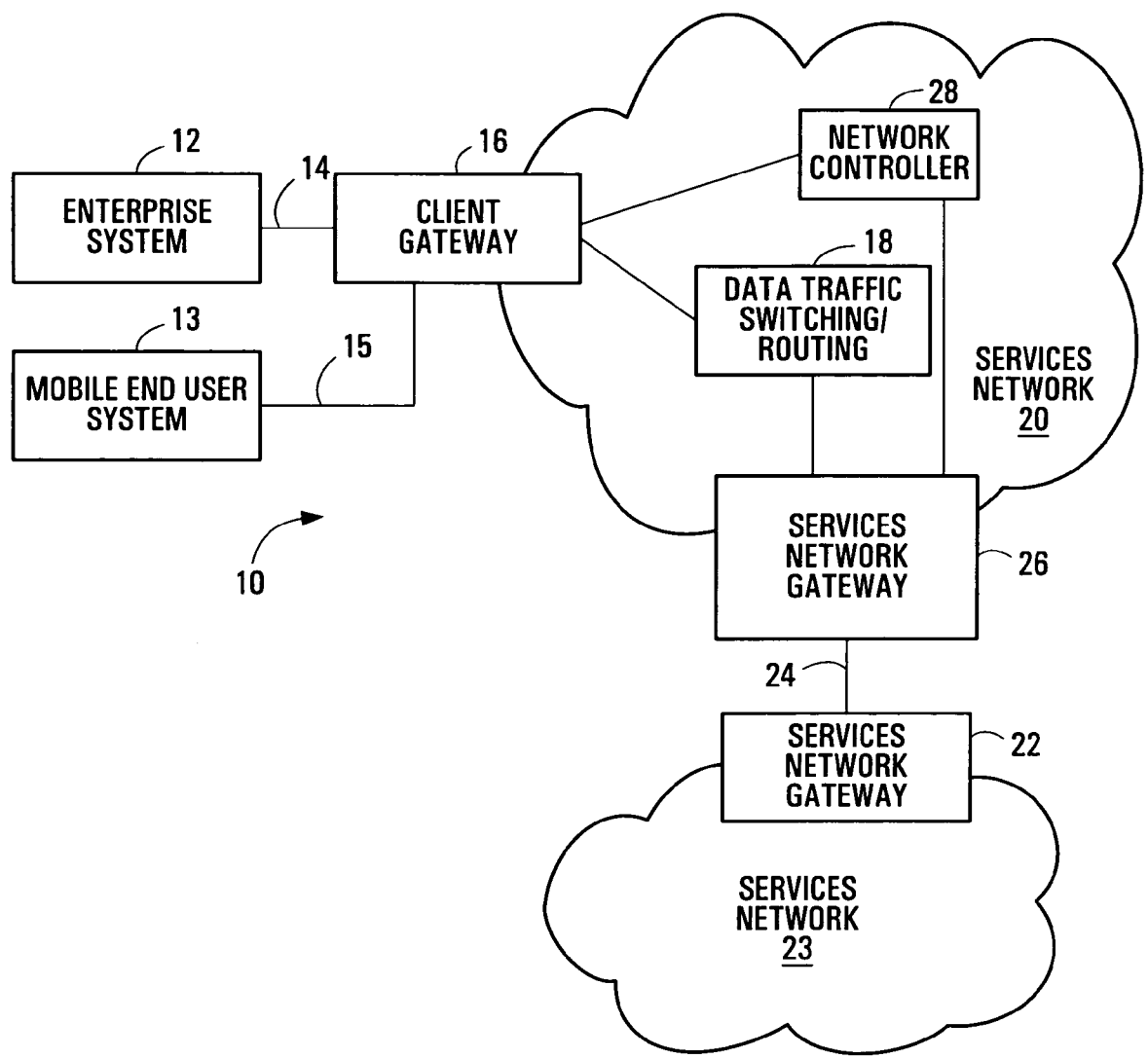
FIG. 1 is a block diagram of a communication system incorporating an embodiment of the invention.

FIG. 1 is a block diagram of a communication system incorporating an embodiment of the invention. The communication system 10 includes an enterprise system 12, a mobile end user system 13, a client gateway 16, a services network 20 which includes data traffic switching and routing components generally designated 18 and a network controller 28, services network gateways 26, 22, and a services network 23.

Although many enterprise systems 12 and/or end user systems such as the mobile end user system 13 can be connected to a client gateway 16, and also, many client gateways 16 and services network gateways 26 may reside at the border of the services network 20, only one example of each of these components has been shown in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The enterprise system 12 represents a private network which may provide, use, or both provide and use, web service applications, offered and managed throughout the services network 20. In a typical installation, an enterprise system includes such components as a firewall to provide external access control and filter external traffic entering the enterprise, traffic switching and routing equipment, one or more servers for supporting network services, and user terminals, illustratively personal computers. A corporate private network is one example of an enterprise system 12.

The mobile end user system 13 is illustrative of an client system which is not part of a specific enterprise system. End user systems may be mobile, as shown, or fixed. The mobile end user system 13 may be connected to the client gateway through a web services mobile gateway, for example. A mobile end user system 13, as well as fixed end user systems, may instead be physically connected to a client gateway 16. A portable computer system is mobile in the sense that it may connect to a client gateway through different locations and physical connections in an access network.

Those skilled in the art will be familiar with many different types of enterprise system and end user system which provide and/or use network services. Embodiments of the present invention relate primarily to managing private and public network services outside an enterprise environment, as opposed to how these services are actually supported in the enterprise system 12 or used in end user systems such as the mobile end user system 13, and accordingly the enterprise system 12, the mobile end user system 13, and their operation are described only briefly herein to the extent necessary to appreciate aspects of the invention.

A virtual extranet service portal, which may be implemented as a software application for instance, in the enterprise system 12 and the mobile end user system 13, allow end network service providers and consumers to interact with the services network 20. A service portal allows users to log into the services network and authenticate themselves with the services network by means of federated identity or another authentication scheme, and may also enable other additional capabilities such as displaying various services lists, descriptions, etc., without substantially affecting how an end user provides and/or consumes network services.

The connections 14, 15 may be direct connections as shown in FIG. 1, or indirect connections which traverse intermediate components and possibly other communication networks generally referred to herein as access networks. However, the present invention is not restricted to network connections, or any other particular type of connection, between the enterprise systems 12, the mobile end user system 13, and the client gateway 16. The connections 14, 15 may thus include any of direct, indirect, wired, and wireless connections.

Access to the services network 20 is provided for the enterprise system 12 and the mobile end user system 13 by the client gateway 16. The client gateway 16 is an edge device into the services network provider infrastructure, and represents a gateway into the virtual extranet service provided by the services network 20. The client gateway 16 is in essence a secure network service proxy appliance for implementing a web service gateway function, supporting proxies for network services and Web services XML "standards", for example, as well as new features. According to one embodiment, the client gateway 16 is a high-performance device implemented at least in part using hardware, and is configured for operation as disclosed herein with embedded software for deployment by a services network provider. An illustrative example of a client gateway 16 is described in detail below with reference to FIG. 2.

It will be apparent from the foregoing that several types of service provider are involved in the system 10. Network services are provided, for example, by the enterprise system 12. The services networks 20, 23 are provided by other different service providers. A network service provider, for the enterprise system 12, thus offers network services, and providers of the services networks 20, 23 provide, to network service providers, another service which implements a network of services within which network service providers may make network service(s) available for use by network service consumers which are outside their own private systems.

A provider of a network service is referred to herein primarily as a network service provider, and a provider of a services network is referred to primarily as a services network provider. Thus, a network service provider provides one or more network services, and a services network provider allows these network services to be offered externally, illustratively in a virtual extranet. In many implementations, it is expected that the services network provider will also own or operate the underlying communication network on which the services network is built, although this need not necessarily be the case in all embodiments of the invention.

The network controller 28 provides control plane functionality of a service manager, and may be implemented as a network scale device, illustratively as a dedicated card for edge routers or a dedicated XML appliance, to be deployed by an operator of a communication network. It is used for managing the virtual extranet service, for hosting the central repository for all web services published within the virtual extranet, policies, service level agreements (SLAs), other network monitoring data, and to secure, manage, provision and store policies for end-to-end network services applications. The network controller 28, like the client gateway 16, is described in further detail below, by way of illustrative example with reference to FIG. 3.

Data traffic traverses the services network 20 through the data switching and/or routing equipment which is designated generally at 18. Whereas control/management traffic is handled by the network controller 28, data traffic is processed by the client gateway 16, and from there, by the switching/routing components 18.

The services networks 20, 23 are preferably implemented as virtual extranet architectures. Although details of the services network 23 have not been explicitly shown in FIG. 1, it should be appreciated that the services network 23 is substantially similar in structure and operation to the services network 20.

In one embodiment, the virtual extranet represents a virtual network built over a basic network infrastructure and an application-level overlay network over the virtual network, as a sort of private-managed services network which uses, for example, Internet technology and underlying Layer 1, 2, 3, and 4 technologies to securely share part of an enterprise's information or operations with multiple enterprises, including suppliers, vendors, partners, customers, or other businesses for instance. While the virtual network may provide for synchronous communication using IP routing within a separate routing plane on top of the physical network, the application level overlay may use application level routers for providing content-based publish-subscribe routing within that services network.

The virtual network of a services network 20, 23 in this case represents a virtual network fabric which may be implemented using layer 1 or 2 forwarding, IP routing and/or application level routing, illustrated by XML router devices. A virtual extranet network may provide connectivity and mechanisms for synchronous communications, e.g. REQUEST/RESPONSE, and also asynchronous communication.

The application-level overlay in the virtual network of a services network 20, 23 may be implemented using application level routers, such as XML routers. Application level routers communicate with each other and end clients at the application layer, but using underlying normal networking facilities. XML routers typically connect to each other with reliable point-to-point byte streams, such as Transmission Control Protocol (TCP), to implement reliable multicast. A primary function of the application-level overlay is to provide connectivity and asynchronous content delivery based subscribers interests, e.g. subscribe/publish.

Building a services network 20, 23 as a virtual network with an overlay allows the services networks 20, 23 to be modified and deployed relatively easily in comparison with conventional private network service sharing techniques. An overlay services network is also an effective way to build a robust mesh that can effectively route XML packets.

Those skilled in the art to which the present invention pertains will be familiar with many different types of communication network on which a separate logical routing plane and an application layer network may be overlaid. The present invention is not in any way limited to implementation in conjunction with a services network having any particular type of underlying communication network.

The services network gateways 26, 22 represent network devices used to link two extranet services, the services networks 20, 23, which are offered by different network providers. Each extranet service is implemented in the core network of each of the network providers, and therefore in different administrative domains. The services network gateways 26, 22 allow network services data traffic from one services network to be forwarded into the other service network and also permits network services control traffic exchange. Each of the services network gateways 26, 22 implements a service gateway-to-gateway exchange function and provides a secure channel of communication with the other services network gateway. The services network gateways 26, 22 thereby provide a mechanism for network services traffic to cross multiple network providers' networks.

Although FIG. 1 shows respective border gateways 26, 22 in each services network 20, 23, a single services network gateway may span both services networks in some embodiments.

A primary purpose of the services network gateways 26, 22 is to support interworking between network services of the services network 20 and the services network 23 while providing means for service logging, transaction auditing, customized service publishing, endpoint accounting, service administration, access policy enforcement, content integrity and confidentiality, and customer application protection. The services network gateways 26, 22 may thus be considered service mediation and delivery points for both services networks 20, 23. As disclosed in further detail herein, the services networks 26, 22 may provide secure access to network services hosted in the services networks 20, 23 by network service consumer clients of either of the services networks 20, 23, illustratively by publishing network services provided by clients in each services network in services registries of the other services network, in accordance with service and managerial policies.

Like the client gateway 16, the services network gateways 26, 22 may be secure network service proxy appliances providing web service gateway functions, and may be implemented as high-performance hardware-based edge devices configured for operation as disclosed herein with embedded software for deployment by services network providers. The services network gateways 26, 22 are described by way of illustrative example below with reference to FIG. 4.

The connection 24 may include any of direct, indirect, wired, and wireless connections, preferably a secure tunnel. Many examples of tunnelling techniques, as well as and other mechanisms for providing secure communications, will be apparent to those skilled in the art.

In operation, the services network 20 enables network services provided by the enterprise system 12 to be made accessible to users connected to the services network 20 in a managed and secure manner and with a flexible application program interface. These users may include users in the enterprise system 12, other client enterprises or end users such as the mobile end user system 13 connected to the services network 20 through the client gateway 22 or another client gateway. The service implemented by the services network 20 is supported by the client gateway 16, which supports communication protocols, and the network controller 28, which supports network, service, and client management functions.

The framework of the services network 20 may be divided into three areas, including communication protocols, service description, and service discovery. In one embodiment, the service network 20 uses existing standards and specifications which have been developed for each of these areas. The services network 20, however, manipulates web services Uniform Resource Identifiers (URIs) to force the web services transactions to occur over the web services network 20 and to force symmetric transaction paths through the client gateway 16 and the public network gateway 26 when multiples of them exist. The manipulation of the web services URI is further explained below.

For example, in the area of communication protocols, SOAP is one standard protocol which may be used to transport web services messages between a web client and a web server application, two service endpoints identified by respective URIs. SOAP is an extensible protocol that may provide for the transfer of additional information. For example, it is widely used to provide for transfer of additional information relating to content security mechanisms being used.

Web Services Description Language (WSDL) is an XML dictionary for describing a Web service, its functionality, specifications, inputs, outputs, and accessible methods. It is a standardized approach to network service description.

These web services protocols (SOAP and WSDL) provide the capabilities and messaging facilities to bind and execute functionality anywhere, on any platform, without the need for custom code.

One well known service discovery mechanism is Universal Description, Discovery, and Integration (UDDI). UDDI defines a standard mechanism for publishing and finding web services, and specifies how registries match WSDL-described service requirements with providers of those services. UDDI enables enterprises and applications to find web services over a services network or the Internet and allows operational registries to be maintained. UDDI lists web services from different companies, and gives their descriptions, location, services descriptions, associated access lists and security levels.

Other web services standards which are referred to herein and may be used in implementing embodiments of the invention include standards relating to addressing (WS-Addressing), reliable messaging (WS-Reliability), policy (WS-Policy), notification (WS-Notification) and identity scope management (WS-Trust and WS-Federation).

Although the above specifications and standards are well known, the use of these standards to manage private and public services in accordance with embodiments of the invention is not known.

As described briefly above, the client gateway 16 is a service delivery point for direct clients of the private extranet service provided by the services network 20.

The client gateway 16 also provides secure access to the private extranet service, protecting both the provider of the service and the client, the enterprise system 12 and the mobile end user system 13 in FIG. 1.

Communications through the client gateway 16 and the services network 20 are preferably secure. Standards-based security techniques such as Transport Layer Security (TLS), Secure Socket Layer (SSL), WS-Security, XML-Encryption, and XML-Signature may be used to provide secure communications while leveraging existent enterprise ingress and egress certificates which would normally already have been established for the enterprise system 12. These standards-based techniques, as well as other techniques which will be apparent to those skilled in the art, ensure that authorized service consumers in the enterprise system 12 can participate in the virtual extranet services network 20.

The client gateway 16 also classifies and splits incoming communication traffic data into control traffic to be forwarded to the network controller 28 and data traffic to be forwarded towards a destination through the components 18 and possibly through another client gateway 16 or a public network gateway 26.

In general, a potential consumer of a network service such as a web service application, can only make use of a network service which is known to exist and has a valid service description. It is thus desirable for a network service provider to communicate the existence of a network service to potential consumers. This may be accomplished by publishing network services to registries, for instance. In the system 10 of FIG. 1, the client gateway 16 allows the enterprise system 12 to publish its internal network services to the services network 20. The client gateway 16 also allows the enterprise system 12 and the mobile end user system 13 to consume external network services provided by other members of the services network 20.

As disclosed in further detail herein, the extent to which the services provided by an enterprise system 12 are made available to other members of the services network 20 may be controlled by the client gateway 12 and the network controller 28.

Network service providers may thus publish internal network services to the services network 20 for use by other members of the services network 20. In many implementations, the services network 20 and the enterprise system 12 are expected to be secure private networks, and communications on the connections 14, 15 are also secure. This may be accomplished using secure tunnelling techniques, examples of which will be readily apparent to those skilled in the art. Secure communications at both access and network sides of the client gateway 16 provide a level of assurance that private network services available to members of the services network 20 are provided only by members of the services network 20 and can only be consumed by members of the services network 20 who are privileged to consume them according to the service access policy provided by the service provider along with the service description.

Since communications with the services network 20 by network service providers and consumers traverse the client gateway 16, the client gateway 16 may also capture comprehensive audit records which may be used locally and/or by the network controller 28 to maintain regulatory and policy compliance, for example. Audit records may also or instead be used by other components or systems, such as a billing system with microbilling capabilities for according service charges to consumers.

The network controller 28 provides the central control plane functions for the services network 20, and thus implements the functionality of a network services manager and a client manager. One main responsibility of maintaining a network services global repository. The network controller 28 may store non-volatile client and service profiles for use in establishing run-time client contexts, for example. Like the client gateway 16, the network controller 28 may be implemented as a high-performance hardware-based device with standard-based software for deployment by a services network provider. It is used for managing the virtual extranet service of the services network 20, to communicate to the client gateway 16 and the services network gateway 26 run-time service and client management and provisioning information regarding the distribution of service descriptions to clients and the enforcement of policies for end-to-end network services, and also to display and manage the list of available network services. While the network controller 28 is the services network management entity, the client gateway 16 and the services network gateway 26 enforce policies and security rules on the actual data. Data traffic traverses a provider's core network, as represented at 18 in FIG. 1, through the client gateway 16, and the network controller 28 processes control and management traffic.

The network controller 28 preferably implements at least a subset of core functions, including network services storage and management of information such as location, ownership, access level groups, service lists, and other basic characteristics of network services, central policy repository and rights management, security specifications, SLA requirements such as hard Quality of Service (QoS) requirements suitable for end business to end business transactions for instance, and additional repositories for things such as client profiles, transaction auditing services, logs, etc. It also maintains client profiles for use by run-time functions such as the federation of identity and brokering of trust with other service networks (not shown).

To be able to offer end-to-end transaction security, reliability of message transport, and identity management, network service providers and services network providers would normally have to meet on middle ground to offer one set of combined management functions. The network controller 28, in conjunction with the client gateway 16, may take the burden off the enterprise system 12 by replacing the enterprise's private management methods and tools with standard-based proxy modules offering the same functions at the edge of the services network 20.

The network controller 28 may also allow some security functions to be delegated to the extranet service, by freeing the local enterprise applications from providing certain security aspects like identity provider service, XML digital signature validation service, XML schema integrity, etc. By using the virtual extranet service, application integration within and between enterprises becomes easier and more efficient, end consumer business applications become more visible, and the costs and complexity associated with addition of partners to an enterprise system are reduced.

The network controller 28 uses client and service profiles that it stores to determine the services that should be made available to each client. The network controller 28 cooperates with the client gateway 16 and the services network gateway 26 to make available to each client a customized subset of network services that the client is privileged to access from the set of services within the services network 20.

Network service management functions for network services offered by network service provider clients of the services network 23 are also provided by the network controller 28. Thus, in accordance with an aspect of the invention, the network controller 28 interacts with the services network gateway 26 and may perform any or all of the above network service management, central policy management, security, and transaction auditing functions, and possibly other functions, for the services network gateway 26.

The services network 23 is substantially similar to the services network 20, providing an extranet service through which its clients, through client gateways and a network controller (not shown), can make network services available to other clients and/or use network services provided by the other clients. Through its services network gateway 22 and the services network gateway 26, the services network 23 may exchange network service control and data traffic with the services network 20.

Operation of the client gateway 16, the network controller 28, and the services network gateways 26, 22 are described in further detail below with reference to FIGS. 2 through 4.

Figure 2:
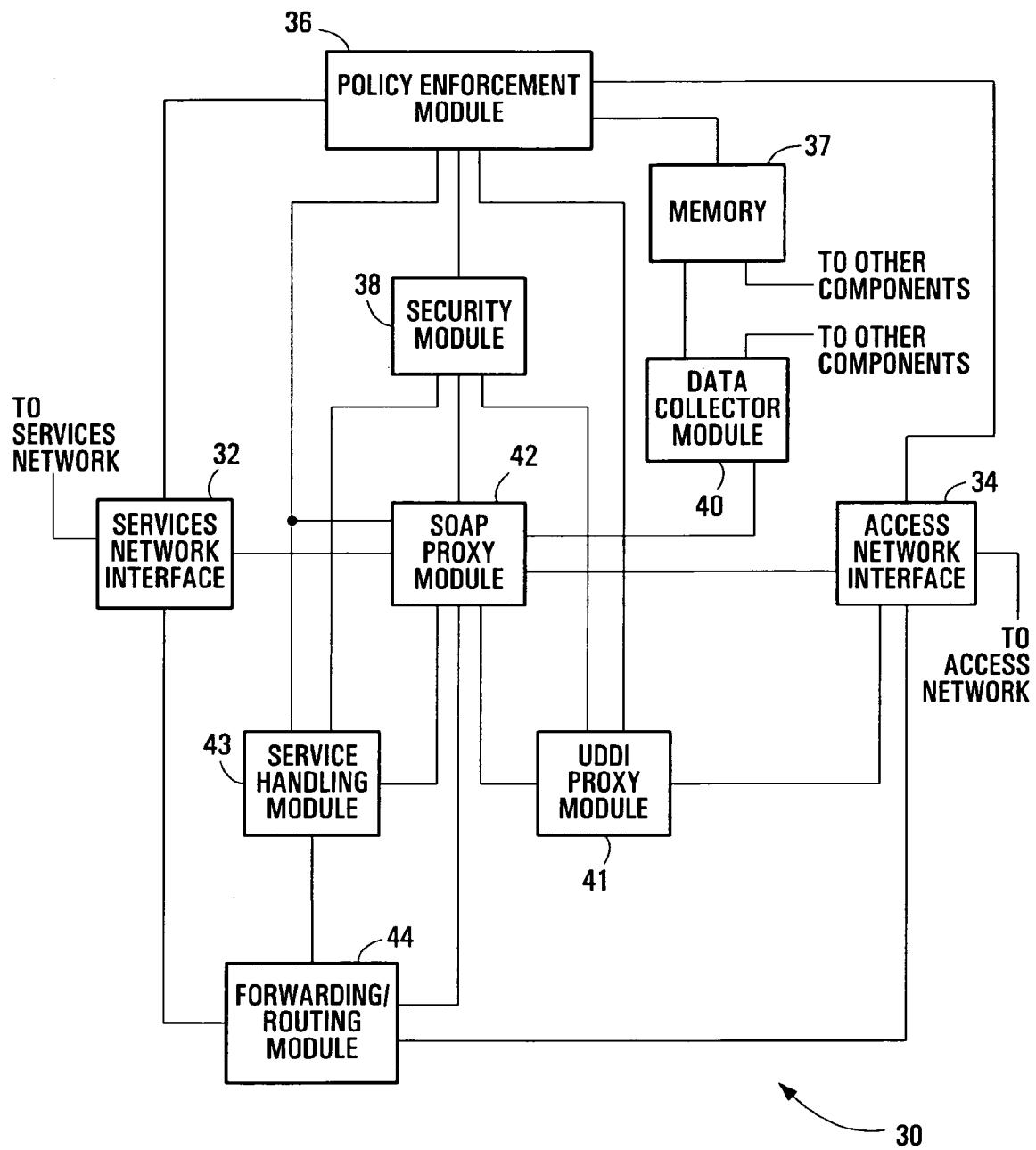
FIG. 2 is a block diagram of an example client gateway.

Considering first the client gateways 16, 26, FIG. 2 is a block diagram of an example client gateway. The client gateway 30 includes a services network interface 32, an access network interface 34, a policy enforcement module 36 operatively coupled to the interfaces 32, 34 and to a memory 37, a security module 38 operatively coupled to the policy enforcement module 36 and to the memory 37, a SOAP proxy module 42 operatively coupled to the interfaces 32, 34, to the policy enforcement module 36, to the security module 38, and to the memory 37, a data collector module 40 operatively coupled to the SOAP proxy module 42 and to the memory 37, a UDDI proxy module 41 which is operatively coupled to the policy enforcement module 36, to the security module 38, to the SOAP proxy module 42, and to the access network interface 34, a service handling module 43 operatively coupled to the policy enforcement module 36, to the security module 38, and to the SOAP proxy module 42, and a forwarding/routing module 44 operatively coupled to the services handling module 42, to the services network interface 32, and to the to the access network interface 34. Although such connections are not explicitly shown in FIG. 2 to avoid congestion, it should be appreciated that any or all of the other components of the client gateway 30 may be operatively coupled to the memory 37 and/or to the data collector module 40.

The access network interface 34 represents a remote access point through which the client gateway 30 connects to an enterprise system or other form of network service provider or consumer. Although labelled as an access network interface in FIG. 2, network service providers and consumers need not necessarily communicate with client gateways through network connections. It should therefore be understood that the interface 34 provides an interface to a member of a services network through an access connection, which may or may not strictly be a network connection.

The structure and operation of the access network interface 34 will be dependent upon the type of connection over which the client gateway 30 communicates with its client. In general, an access network interface 34 would include physical components which exchange communication signals with a communication medium, and hardware- and/or software-implemented components which generate and process the communication signals. Various implementations of such an interface will be apparent to those skilled in the art.

According to one embodiment, the access network interface 34 performs security tunnel termination for clients attempting to connect into services network 20 (FIG. 1). Virtual Local Area Network (VLAN), Point-to-Point Protocol (PPP), Multi-Protocol Label Switching (MPLS), and IP Security (IPSec) are all examples of protocols which may be used by the access network interface 34 to communicate with a client. Other protocols and communication schemes will be apparent to those skilled in the art.

The memory 37 may include one or more memory devices, such as solid state memory devices, for storing information. Other types of memory device, including memory devices for use in conjunction with movable and/or removable storage media, and multiple memory devices of different types, may also be provided as the memory 37. The type of memory device or devices implemented as the memory 37 in the client gateway 30 is a matter of design, and will be dependent upon the particular type of equipment in which the client gateway 30 is implemented. A circuit card for communication equipment, for example, would normally incorporate volatile and non-volatile solid state memory devices as the memory 37.

As will become apparent as the present description proceeds, the information stored in the memory 37 may be used by the functional components of the client gateway 30 in performing their respective functions. Any or all of the functional components 36, 38, 40, 41, 42, 43, 44 may access information stored in the memory 37. Similarly, although no connection between the memory 37 and the interfaces 32, 34 has been shown in FIG. 2 to avoid congestion, these interfaces or internal components thereof may also interact with the memory 37.

Some or all of the functional components 36, 38, 40, 41, 42, 43, 44, as well as internal functions or components of the interfaces 32, 34, may be implemented as software, which might also be stored in the memory 37.

The form of the internal connections between components of FIG. 2 would be dependent upon the particular type of equipment in which the client gateway 30 is implemented. Internal bus structures, for example, are often used in electronic devices, although other types of connection may be used in addition to or instead of an internal bus. It should also be appreciated that interconnections need not necessarily be via a physical medium, as in the case of software-based implementations for instance.

Functional components which implement services network functions of the client gateway 30 have been shown in somewhat more detail than access-side functions in FIG. 2, as embodiments of the invention relate primarily to functions which are performed on the services network side of the access network interface 34. For example, whereas the access network interface 34 provides security functions for access connections, a security module 38 which provides network-side security functions has been shown separately from the services network interface 32 in FIG. 2. Other network-side functional components have similarly been shown separately in FIG. 2 for illustrative purposes.

This representation of separate functional components in the client gateway 30 is not intended to limit the present invention. The network-side functions a client gateway may be implemented using further or fewer components than explicitly shown in FIG. 2, possibly with different interconnections. For example, functions of the policy enforcement module 36 could be incorporated into each component which applies policies. Security policies could be both managed and applied by the security module 38 for instance.

In software-based embodiments, functions may be implemented in respective software modules or combined into fewer software modules for execution by a single hardware component, namely a processor such as a microprocessor, an Application Specific Integrated Circuit (ASIC), a Digital Signal Processor (DSP), or a microcontroller. Software might instead be executed by multiple hardware components, a microprocessor and a DSP or a network processor plus several ASICs and FPGAs for instance. Combined implementations in which some functions are implemented in software and others are implemented in hardware, which tends to operate faster than software, are also contemplated.

Accordingly, functions may be divided or integrated in a different manner than shown in FIG. 2, and any of the functional modules described herein may be implemented in software, hardware, or some combination thereof.

The policy enforcement module 36 implements services network policy enforcement for network services as configured by services network clients in their client profiles and advertised in their services' descriptions to the network controller 28.

Policy assertions that specify traditional requirements and capabilities that will ultimately manifest on the wire, such as an authentication scheme required for a specific customer and/or transport protocol selection for instance, are implemented in the client gateway. Therefore, these policies assertions are downloaded from a network controller into client gateways and enforced by the policy enforcement module 36.

Authentication and authorization of network service providers and consumers, administration and verification of transactions involving network services, and ensuring privacy and integrity of communication traffic associated with network services are examples of functions which may be involved in enforcing policies by the policy enforcement module 36 in conjunction with other components. The policy enforcement module 36 may interact with the security module 38, for example, for authentication such as by verifying a message digital signature. Thus, enforcement of security policies may involve both the policy enforcement module 36, which manages the policies, and the security module 38, which actually applies the policies by authenticating clients and possibly passing or dropping communication traffic, for example.

It should therefore be appreciated that the policy enforcement module 36 need not itself actually apply the policies it manages for enforcement. Interaction between the policy enforcement module 36 and other components to apply policies to services network clients and transactions will be come apparent as the present description proceeds.

Through the policy enforcement module 36 at the client gateway 30, client authentication with the virtual extranet service is provided, rather than with each specific network web service as happens with current enterprise-centric network services. A network service consumer in a network service provider system with which the access network interface 34 communicates are clients of the client gateway 30, and gain access to network services across a services network through a single sign-on with the client gateway 30. The client gateway 30 thus removes the per-service authentication burden from its clients. Information to be used in client authentication is an example of one type of information which may be stored in the memory 37, preferably in a secure memory device or area.

For the case when a client XML digital signature is not present, the policy enforcement module 36 may cooperate with the security module 38 to generate a security assertion in accordance with what the end network service expects in terms of security assertions. The new security assertion is attached to service messages to assert the identity of the client and the integrity of the message.

When the client's identity "preference" is present but is different from the network service's "preference" the policy enforcement module 36 may cooperate with the security module 38 to map a specific digital certificate, illustratively an X.509 certificate into a different security assertion, such as a Security Assertion Markup Language (SAML) assertion.

Well known mechanisms drawn from standards such as SAML, WS-Federation, and WS-Trust are preferably used for these functions.

In one embodiment, the policy enforcement module 36 offers hardware implementation of federated identity, access control, and enforcement of policies that have been set up in advance using the network controller 28 (FIG. 1). Federated identity allows users to create and authenticate a user identity and then share the identity between domains and service providers without centrally storing personal information.

SLAs, tailored for we services operations, may also be in place for either or both of access-side and network-side communication links through which the client gateway 30 communicates with its clients and a services network. The policy enforcement module 36 may also monitor communication traffic levels to enforce SLA-related parameters, which may be stored in the memory 37.

As described briefly above, the virtual extranet services network according to an embodiment of the invention is XML-standard based, and accordingly the policy enforcement module 36, in conjunction with the service handling module 43 described below, may also enforce XML message header and message payload transformations for ingress data traffic received from clients of the client gateway 30 through on the access network interface 34. Transformations may also be made from other message formats into XML-standard based network service messages. Inverse transformations, as well as transformations between non-XML formats used in access networks and services networks are also contemplated.

The security module 38 implements security standards to guarantee the security of communications over the services network. In some embodiments, the security module 38 uses web services standards-based tools such as WS-Security, XML-Encryption/Description, and XML-Signature to provide secure datapaths between services network members. These tools allow the client gateway 30 to leverage existent security protocols to ensure that authorized service consumers can participate in an end-to-end private business network. The security module 38 thus represents, in some embodiments, a central certificate and key management service for an enhanced over the core extranet service. The security module 38 provides security functions to all other modules of the client gateway 30, and specifically to the policy enforcement module 36, the UDDI proxy module 41, the SOAP proxy module 42, the service handling module 43, and both network interfaces 32, 34. These functions may include any or all of verification of signatures, encryption, decryption, signing, and exchanging of symmetric or asymmetric keys using protocols that are well known in the field of telecommunications security.

The SOAP proxy module 42 performs SOAP header handling for incoming and outgoing messages between clients and the services network. The SOAP proxy module 42 is a host that has two service addresses in two network interfaces: the access network 34 interface and the services network interface 32. As far as clients in the access network are concerned, all services advertised to the client by the services network appear to be offered from the SOAP proxy module 42.

Messages from either of the two connected networks are addressed to the SOAP proxy module 42, which receives SOAP messages, performs such functions and modifications as header handling, and relays the messages to the appropriate processing facility, the UDDI proxy module 41 or the services handling module 43. Also, messages from the UDDI proxy module 41 and the service handling module 43 are sent to the SOAP proxy module 42. Messages received from the UDDI proxy module 41 or the service handling module may be processed by the SOAP proxy module 42 to append Uniform Resource Identifier (URI) addressing information for instance. The SOAP proxy module 42 also interacts with the policy enforcement module 36 and the security module 38 to implement the network service policy on the outgoing message, and then sends the message on the appropriate interface. Policy enforcement, security, access control, auditing, and other functions associated with other modules of the client gateway 30 may thus be triggered by the SOAP proxy module 42 for each message.

To illustrate the operation of the SOAP proxy module 42, consider the following illustrative example: A service offered by one enterprise EB to another enterprise EA is proxied by the client gateway associated with EA to appear as if offered from a URI of the SOAP proxy module SPA of the client gateway. A service request from enterprise EA for a service offered by enterprise EB is sent to the SOAP proxy module SPA, which applies a set of functions and passes the message to the services handling module 43. Upon processing the service request, the services handling module 43 passes the message to the SOAP proxy module SPA, which appends the SOAP source and destination URIs SPA and SPB respectively, where SPB is the SOAP proxy module associated with the client gateway of enterprise EB. The request is then sent from SPA to SPB.

SOAP proxy module SPB further manipulates the SOAP source and address URIs of the message to SPB and EB before forwarding the request to enterprise EB. In the reverse direction, similar modifications are applied to the response. The SOAP URI is manipulated in such a way to store both the service URI and the SOAP proxy of the gateway associated with that service.

The SOAP proxy module 42 classifies and splits incoming traffic into UDDI control traffic to be forwarded to the UDDI proxy module 41 and data traffic, illustratively XML traffic, to be forwarded to the services handling module. Traffic classification may involve deep packet inspection, for example.

Although not explicitly shown in FIG. 2 to avoid congestion, a traffic classifier of the SOAP proxy module 42 may be operatively coupled to either the services network interface 32 or to another interface which supports communications with a network controller, to provide for exchange of control and/or management traffic with a network controller. It should also be appreciated that the SOAP proxy module 42 may receive control and/or management traffic from a network controller.

The UDDI proxy module 41 acts as an access point into a UDDI central repository hosted by the services extranet network, for all UDDI Publish requests received from clients trying to publish new web services or subscribe to published changes of existent web services, and as a proxy module, for all UDDI inquiry requests received from clients initiating 'find service' operations. Client access to network services is controlled, as disclosed herein, in accordance with network service policies. These policies may be enforced by the policy enforcement module 36 itself or in conjunction with the UDDI proxy module 41 to restrict the network services for which information is returned to a client system responsive to a find service or analogous operation.

The UDDI proxy module 41 expects ingress UDDI-based messages. All other messages that are not UDDI-framed may be discarded by the UDDI proxy module 41.

The UDDI proxy module 41 may cache UDDI entries locally at the client gateway level. This allows the UDDI proxy module 41 to perform local entry lookup and resolution when new UDDI inquiry requests are received. If a UDDI entry is locally found, then a UDDI response message is generated and sent back towards the client requesting the service.

If no UDDI entry is locally found, then a UDDI inquiry message is sent to the network controller, for a global look-up into the UDDI global repository. Once the entry is resolved by the network controller, a UDDI response is sent back to the same client gateway from where the request came. The client gateway 30 may learn and store the UDDI information for further UDDI lookups.

Thus, the UDDI proxy module 41 may handle local and remote resolution of service requests.

The service handling module 43 receives service messages from the SOAP proxy module 42, handles the service messages, and sends service messages to the SOAP proxy module 42. One primary function of the service handling module 43 is to process data traffic associated with a network service and being exchanged between the network service provider and consumer. In one embodiment, for example, service messages coming from the access network through the SOAP proxy module 42 are sent to the service handling module 43, which parses and modifies the messages to adapt them to the services network addressing and formatting rules. Formatting rules may be specified in a services network transform policy managed by the policy enforcement module 36, for example. The service handling module 43 then sends a corresponding service message to the client gateway associated with the network service provider through the SOAP proxy module and across the services network.

The forwarding/routing module 44 preferably performs preferably performs forwarding/routing decisions (Layer1 or Layer2 forwarding, IP and/or XML routing), towards destinations within the services. Although this module 44 may have the ability to handle IP traffic, complete with DNS lookups when necessary, as well as networking at the XML level, other embodiments may provide only one, different, or possibly additional routing mechanisms.

When application layer routing is provided, the basic functionality of the module 44 is to provide content-based routing for the service handling module 43. The service handling module 43 may use the forwarding/routing module 44 to identify SOAP endpoints for a published message. An example embodiment of the SOAP proxy module 42, the service handling module 43, and the forwarding/routing module 44 provides necessary mechanisms for publish-subscribe style networking.

An application routing layer of the forwarding/routing module 44 is optional and is best suited to support notification and event distribution type services. In one embodiment, the application routing layer stores client subscriptions in a subscription database, and upon reception of an XML multicast document that matches a set of entries in the subscription database, uses these entries to identify the next SOAP endpoints that require the document and forwards the document to those endpoints through the SOAP proxy module 42. The subscription for documents and publication of documents follow standardized mechanism outlined in the WS-Notification and WS-Eventing recommendations.

The services network interface 32 provides at least a physical interface to a services network. The type and structure of the services network interface 32, and other operations which may be performed on communication traffic which is exchanged with a services network, will be services network-dependent. Many examples of such network interfaces will be apparent to those skilled in the art.

The data collector module 40 gathers real-time management and billing information, which may be processed locally and/or forwarded to a network controller or other component for further storage and processing.

Once all operations are executed successfully at the policy enforcement module 36 and a security enforcement point in the security module 38, secure client identity and message integrity can be guaranteed within the services extranet network.

At this point, the data collector module 40 can pull real-time information for various management and billing operations. Data may be collected for activities like transaction auditing, performance auditing, event monitoring, transactional end-to-end business activity monitoring (transaction completion/failure), activity logs, SLA monitoring, warnings and errors thresholds, alerts, etc. The data collector 40 may collect information at any of various stages in a datapath, such as after the security module 38 to count packets discarded per security policy, at the policy enforcement level to compile statistics on discard policies, etc.

A client gateway such as shown in FIG. 2 may be configured to allow a network service provider to offer its services into a services network as local services, to allow a network service consumer to use network services which are available in the services network, or both. A client enterprise of the client gateway 30 may include both network service providers, in the form of enterprise application servers, and end user network service consumers.

When a client of the client gateway 30 has authenticated with the client gateway 30 and wishes to offer its network services into a services network, control traffic received from the client, illustratively through a secure tunnel terminated at the access network interface 34 or as encrypted and signed messages, is processed as described above, and forwarded to the network controller in the services network.

The level of availability of a network service in the services network may be determined on the basis of an explicit access control rules specified by the network service provider or the network controller. A network service provider might request that a network service remain private, for use only by consumers within its own private enterprise system. Although not accessible to other members of a services network, restricting access to a private network service in a services network would allow a network service provider to take advantage of other functions of a services network, including policy enforcement and registry hosting for instance. Semi-private network services are also envisioned, in which a network service provider specifies particular services network members or groups to which a network service is to be made available. An unrestricted network service is accessible to all members of a services network, and in accordance with an aspect of the invention, may or may not also be offered to clients of the services network 23. Network services provided by clients of the services network 23 may similarly be offered in the services network 20 through the services network gateways 22, 26.

Predetermined network service access controls may instead be configured at a network controller and applied to network services according to a type or class of a network service or a provider of the network service. All network services from a particular network service provider might have the same predetermined access controls which are established when the network service provider first registers with the services network, for example. Each network service provider may instead have a set of relationship categories, such as partners, suppliers, customers, and so on. In this case, privilege of access to each service may be given to one category, for example, and denied for another one. Another possible predetermined access control regime would make network services of a group of network service providers which have an existing business relationship available within only that group. Public network services imported into the services network from a public network as disclosed herein would generally be available to all clients of the services network.

In a central policy management model, any access controls associated with a network service are stored as a service context or policy by the network controller. These policies are downloaded to each client gateway by the policy enforcement module 36 and applied to the data traffic as described above. Client contexts may be downloaded to the policy enforcement module 36 at run time to support mobility of the end user system 13 (FIG. 1) for instance.

Regardless of the particular access control scheme used to establish and manage access controls for network services, offered network services are made available within the services network in accordance with any access controls for each network service. This may be accomplished in several ways. As described above, control traffic is forwarded to and processed by a network controller in the services network. In this case, the network controller may publish information for the service in a registry which is accessible to client gateways in the services network. Each client gateway then controls access to registered network services by its clients in accordance with policies associated with the network services.

The present invention in no way limited to the above examples of network service access controls. Access controls need not necessarily be implemented at all within a services network. In some embodiments, all network services offered within a services network are automatically available to all members of the services network.

A network service provider can preferably also modify policies of a network service, to change access controls for instance, in a substantially similar manner by exchanging control traffic with a network controller.

Once a client service message has been authenticated by the policy enforcement module 36 and security module 42, the client message can also or instead access network services available in a services network through the client gateway 30. The particular network services which a client is able to access are controlled in accordance with policies managed by the policy enforcement module 36. A global registry of the services network might include registry entries for network services which are not available to every client, as specified in network service policies stored by a network controller and downloaded to the policy enforcement module 36. Only those network services to which a client of the client gateway 30 is allowed access are made available to the client.

Data traffic which is subsequently exchanged between a client of the client gateway 30 and a remote network service provider through the services network is processed substantially as described above. Traffic destined for the remote network service provider from the client is processed based on security policies by the security module 38, modified in the SOAP proxy module 42 and handled differently based on the XML message type in the service handling module 43, and finally the data traffic is routed to the remote network service provider, or actually to the client gateway to which the remote network service provider is connected, by the routing module 44 through the services network interface 32.

Substantially similar processing is applied to data traffic associated with a network service provided by a client of the client gateway 30. Data traffic received from a remote network service customer through the services network interface 32 is processed, modified, and classified and handled as data traffic by the security module 38, the SOAP proxy module 42, and the service handling module 43. Received data traffic is then forwarded to the client by the access network interface 34.

Figure 3:
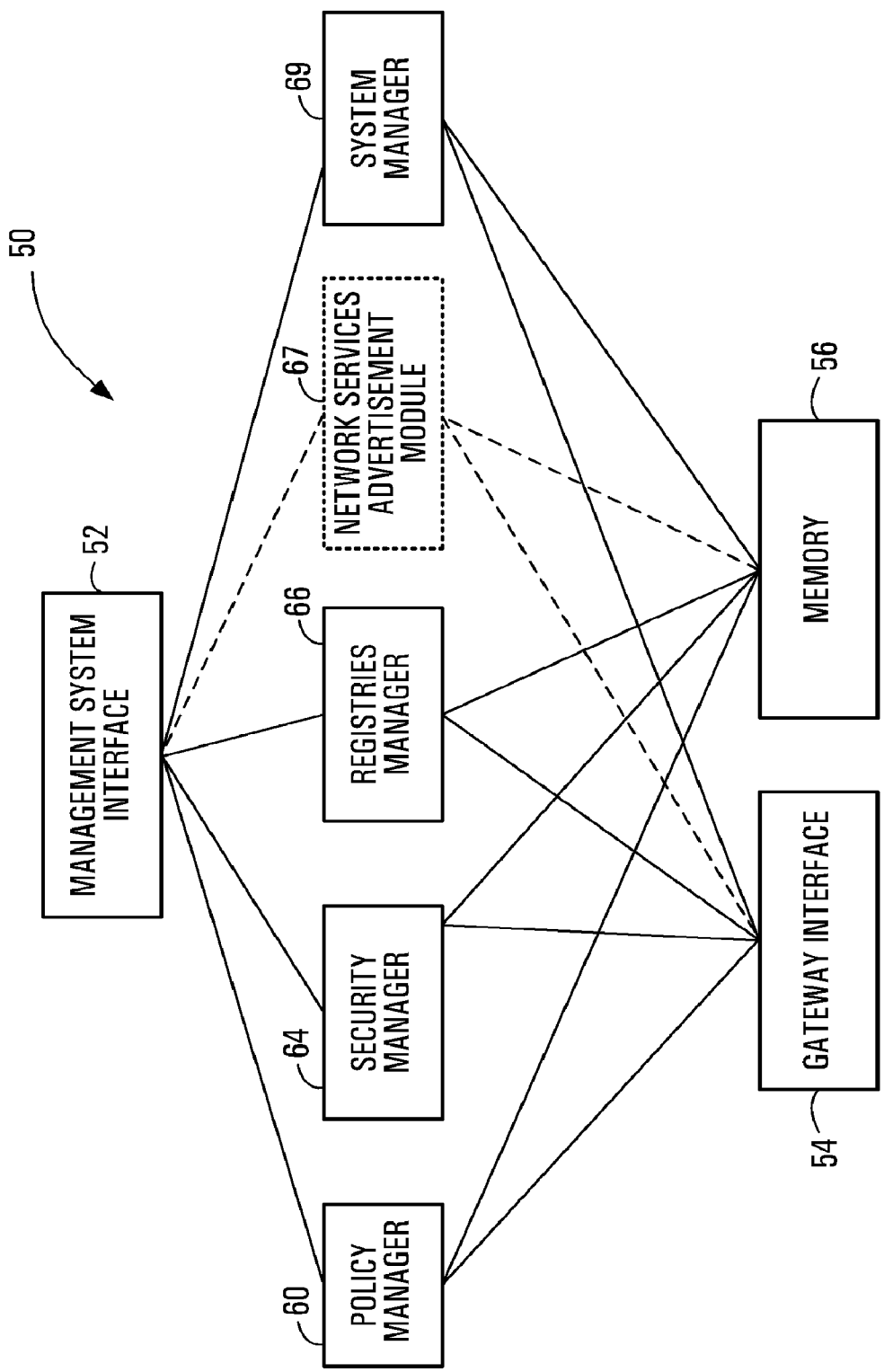
FIG. 3 is a block diagram of an example network controller.

Turning now to the network controller 28 (FIG. 1), FIG. 3 is a block diagram of an example network controller. The network controller 50 includes a management system interface 52, a gateway interface 54, and a memory 56 which are operatively coupled to managers 60, 64, 66, 69. The components of the network controller 50 may be provided in either a centralized architecture or a distributed and preferably centrally manageable architecture.

The management system interface 52 provides an interface to a management system, such as a Network Management System (NMS) for instance, which implements a central framework for configuration and management of a services network platform. The structure and operation of the management system interface 52 will be dependent upon the type of connection over which the network controller 50 communicates with its management system. In some embodiments, a network controller communicates with a management system through a managed communication network. Separate NMS management and control channels are also common. Examples of both types of management system interface, including interfaces using XML and interfaces which provide access to Management Information Bases (MIBs) for instance, will be apparent to those skilled in the art.

The gateway interface 54 represents an interface through which the network controller 50 communicates with client and services network gateways. Although shown as a single component in FIG. 3, the gateway interface 54 may include respective interfaces, and possibly different types of interface, for communication with multiple client gateways. As described above with reference to FIG. 2, control traffic may be exchanged between a client gateway and a network controller through the services network, using a services network interface, or some other type of interface. The gateway interface 54 of FIG. 3 thus represents an interface which is compatible with an interface, either the services network interface 32 (FIG. 2) or another interface, provided at client and services network gateways.

Like the interfaces described above with reference to FIG. 2, the management system interface 52 and the gateway interface 54 would generally include physical components which exchange communication signals with a communication medium, and hardware- and/or software-implemented components which generate and process the communication signals.

The memory 56 includes one or more memory devices for storing information. The information stored in the memory 56 may include information such as customer profiles and policies, security information, and access lists and access level groups per user per network service for use by components of the network controller 50, as well as registry information for access and use by other equipment in a services network. It should be appreciated, however, that the memory 56 may include both local and remote memory devices. Whereas network controller software is preferably stored locally, registries might be distributed and stored in remote memory devices which are accessible to both the network controller 50 and client and services network gateways to which network service consumers are connected.

Some or all of the managers 60, 64, 66, 69, and internal functions or components of the interfaces 52, 54, may be implemented as software. Software implementing these managers and functions might also be stored in the memory 56.

The policy manager 60 provides comprehensive policy provisioning, definition and security policy management capabilities. Policy management is centralized by the policy manager 60, although the policies pieces of content and data may be stored in a distributed manner throughout the services network. Policy components, such as the policy manager 60 and a registry in the memory 56 in which policy information is stored for instance, may be distributed. Also, policies information is downloaded into the policy enforcement modules in client gateways, as described above, and in services network gateways. By utilizing a centralized approach to policy management for network services, a single set of policies can be managed by delegated administrators, in the services network provider's infrastructure. The policy manager 60 may be configured to automatically download or push policy information to client and services network gateways, to transmit policy information responsive to requests from gateways, or support both push and pull policy information transfer mechanisms.

According to one embodiment, the policy manager 60 manages network service policies using a network service policies registry. The network services policies registry is a collection of network service policies which establish access controls for all network services offered within a services network. The policy registries may be part of a data registry that is used to store other information such as service description and client profiles.

Each individual network service policy may specify privacy parameters, such as the authentication information which must be presented in a message, whether a message has to be signed and/or encrypted, which parts of a message are to be signed and/or encrypted, and how messages or parts thereof are to be signed and/or encrypted. These functions may be provided by implementing existent web services standards, like WS-Security, WS-Policy, WS-PolicyAttachment, WS-PolicyAssertions and WS-SecurityPolicy. There may also be rules indicating the levels of access to specific network services, illustratively private, semi-private/group, and public at the virtual extranet level. There may also be SLA agreements and QoS requirements for the end-to-end services, and lists and details regarding business partners involved in specific business transactions.

For any new network services providers or consumers joining a services network, consumer profiles and policies are preferably created at registration time. As described above, a network service provider publishes its network services within a services network by sending control traffic to a network controller through a client gateway or a public network gateway. In accordance with an aspect of the invention, a network controller may also manage public network services, which may be consumed through a public network, as specified by public network service policies. In general, policies received from gateways through the gateway interface 54 or from a management system through the management system interface 52 are centrally managed by the policy manager 60 within the extranet service, but physically distributed within the virtual extranet provided by the services network.

Where a network service provider or consumer has its own service policies at the time of joining a services network, the policy manager 60 may allow the external service policies to be integrated into the services network's global policy registry. All management data at the extranet level may thereby be integrated with other data from enterprise management systems in order to create a globally-managed virtual extranet service.

The policy manager 60 also manages user authorizations and security profiles within the services network rather than with specific network service applications as is the typical scenario within an enterprise, and manages the authorization of the authenticated client endpoint. A network service consumer in the enterprise space, for example, connects to the services network through a client gateway and does a single-sign-on with the services network. The centralization of access control information into one registry entity hosted by the network controller avoids the problem of sharing identity information and access control policies between enterprise systems. Instead, this data is stored within the virtual extranet.

The policy manager 60 may also accommodate legacy authorization systems, illustratively by offering the data necessary for translating existent proprietary session cookies into SAML assertions and real-world identities that can then be mapped to other identity repositories.

The policy manager 60 may specify message header and message payload transformations to be applied to data traffic by client gateways. In some embodiments, transformations are made between XML-based web service messages and other formats of messages in accordance with information, illustratively XML schemas, stored in a registry.

The security manager 64 manages the security of communications through a services network. In one embodiment, the security manager 64 uses established network services and XML standards to guarantee secure communications. For example, a secure datapath created over the services network core may use WS-Security and XML-Encryption, as described above. Whereas gateways actually establish secure connections through a services network, the security manager 64 provides a central certificate and key management service for the services network. Security information is downloaded to gateways for use in establishing secure communications with other gateways through the services network. Like the policy manager 60, the security manager 64 may be configured to automatically download or push security information to gateways, to transmit security information responsive to requests from gateways at runtime when gateways require security information for network services transactions, or support both push and pull transfer mechanisms.

The registries manager 66 manages and sanitizes network service registries, illustratively industry standard registries such as UDDI, with advanced meta-data capabilities for network service location and management. The services network provider can store registry entries for available network services based on classification categories and branding they define, for example. In one embodiment, network services are organized in a registry according to permitted levels of access, which may include private, public, semi-private group, and/or others. As described above, some network services may be published privately to specific partners, while other network services are published publicly to the whole services network.

A network services registry managed by the registries manager 66 is a collection of network services from all network service providers connected directly or indirectly to a services network. For a new network service provider or consumer which does not have any registries capability at the time when it joins the services network, the registries manager 66 offers a full collections of network services, descriptions, locations, ownerships, and public APIs that allow a network service to be advertised and consumed. A network service provider may instead have its own registries at the time when it joins the services network, in which case the registries manager may allow the provider's network services to be published into the services network's global network service registry.

Other meta-data registries may also be available for storing network services information for purposes other than basic network service location and management. These may include registries for use by other network controller components to manage service aspects such as timeouts, XML schemas to be applied, service contracts, QoS parameters, and subscription and addressing information. Additional registries may store collections of data obtained as a result of storing billing information, SLA monitoring information, transactional end-to-end business activity monitoring information, activity logs and performance auditing information, and exception alerts, and also client profiles which include billing, preferences, partners, etc., for instance. User credentials, general policies and security policies may be stored in the registries as well.

In some embodiments, clients of a services network have real-time console-access and management tools for real-time monitoring and querying of all registry information, in accordance with their service policy.

The system manager 69 receives audit records captured by gateways to provide centralized control, monitoring, and auditing of transactions, events, warnings, and alerts, for instance, and may also manage delivery of comprehensive contracts and SLAs. Transaction priorities are preferably implemented based on their criticality. Other possible functions of the system manager 69 include reporting on transaction completions/failures and management of SLA contracts.

As described briefly above, services network gateways implement and enforce a secure datapath, illustratively an XML datapath, and a control path for network services traffic between different network providers implementing the same extranet-based service.

When two network providers implement the same extranet service model, there is a possibility to enrich each services network with network services located in the other services network.

Inter-services network communications through services network gateways enable network service consumer clients of each services network to take advantage of an enlarged set of network services. Network service provider clients of the services network can also make their network services visible and accessible in multiple different services networks having respective administrative domains with respective sets of clients.

A services network gateway in a services network provides an edge device function, used for communication with another services network, preferably through a peer services network gateway in the other services network. Peer services network gateways may be operationally connected one-to-one in a point-to-point fashion, by means of static provisioning or dynamic discovery. The one-to-one connection might be a direct link, as shown in FIG. 1, or an indirect link, such as a network link which traverses another communication network.

Network services data traffic is forwarded by a services network gateway, at wire-speed, on a secure datapath towards another services network. Services network gateways also exchange network services control traffic for the purpose of advertising network services of one services network into another services network. In one embodiment, each services network gateway shares network service presence information with one or more peer services network gateways in other services networks.

Services network gateways interact with network controllers to export network services to other services network and to import network services from other services networks. When multiple network controllers are available within a services network extranet, the services network gateway preferably interacts directly only with one designated network controller. A designated network controller is selected and then enforced by means of provisioning at the service network gateway interface or box level. A designated network controller might be substantially the same as an ordinary network controller, but configured as a designated network controller through a command line interface (CLI) of an operator terminal through a management system interface 52 (FIG. 3), for example. As described in further detail below, at least a designated network controller may include a netwotrk services advertisement module 67.

Where network services registries are maintained in multiple network controllers within one services network, the network controllers will communicate among themselves for exchanging control information about the services contained in each of their registries and about these services' local storage.

Therefore, a network controller may end up by storing into its registries information, provided to it by client gateways and possibly other network controllers, associated with internal network services provided by its own clients and information associated with external network services available from network service providers in other services networks. The designated network controller in a multiple-controller services network may receive network service-related information from other network controllers, services network gateways, or both.

Network services may be published to registries with a distinctive service type, internal versus external. A designated network controller receiving network services updates coming from a services network gateway may publish them automatically as external, whereas new network services registered through client gateways are published as internal.

When an internal network service is being used by a client of a services network, a client gateway through which the client accesses the services network forwards network services ingress traffic toward its destination, another client gateway of the services network for instance. In the case of an external network service, the client gateway forwards data traffic toward the services network gateway listed in the services network registry for the external network service. The underlying mechanism for a client gateway to exchange traffic with a services network gateway can be based on any tunneling protocols supported in the core network.

Like a client gateway, a services network gateway classifies and splits incoming data traffic from an external services gateway into control traffic to be forwarded to the local designated network controller and data traffic to be forwarded towards a destination. It also forwards outgoing control data, including information about the presence of local network services to be flooded or advertised to the next peer border gateway, illustratively in the form of advertisement messages containing lists of valid network services and their descriptions. In some embodiments, the outgoing control data is generated by the local designated network controller and is sent down to the services network gateway for publication to peer services network gateways.

Since client identity and access control functions are implemented at client gateways in a services network, these functions need not be provided by services network gateways in some embodiments. Network services data security, on the other hand, may be provided at services network gateways in a substantially similar manner as at client gateways, using WS-Security, XML-Encryption and XML-Signature, for example. Services network gateways also preferably implement enforcement of policies which have been established using the local network controllers.

Audit and monitoring records compiled by services network gateways may be locally stored and processed by each services network gateways, sent to network controllers or other systems in one or more services networks for processing, or both. Network controllers may use such records to check regulatory and policy compliance, for example.

Figure 4:
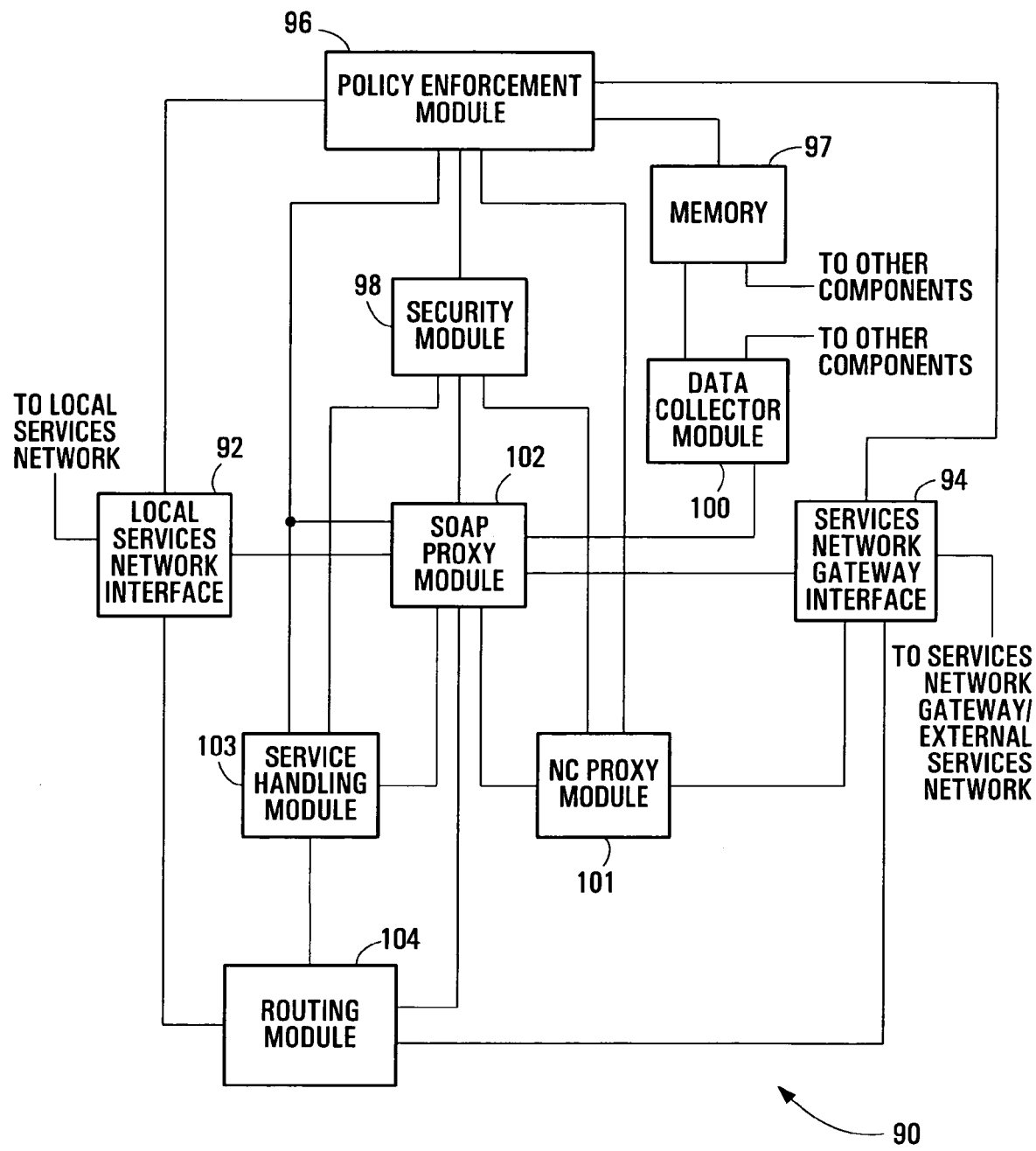
FIG. 4 is a block diagram of an example services network border gateway.

The operation of a services network gateway will become apparent from the following detailed description of FIG. 4, which is a block diagram of an example services network gateway.

The services network gateway 90 includes a local services network interface 92, a services network gateway interface 94, a policy enforcement module 96 operatively coupled to the interfaces 92, 94, and to the memory 97, a security module 98 operatively coupled to the policy enforcement module 96, a SOAP Proxy module 102 operatively coupled to the policy enforcement module 96, to the security module 98, and to the interfaces 92, 94, a data collector module 100 operatively coupled to the SOAP proxy module 102, and to the memory 97, a service handling module 103 operatively coupled to the policy enforcement module 96, to the security module 98, and to the SOAP proxy module 102, a network controller (NC) proxy module 101 operatively coupled to the policy enforcement module 96, to the security module 98, to the SOAP proxy module 102, and to the services network gateway interface 94, and a forwarding module 104 operatively coupled to the SOAP proxy module 102, to the service handling module 103, to the services network interface 92, and to the services network gateway interface 94. As noted above for the client gateway 30 of FIG. 2, other interconnections between the components of FIG. 4 may be provided in some embodiments, but have not been explicitly shown to avoid congestion.

It will be apparent from a comparison of FIGS. 2 and 4 that a client gateway and a services network gateway may have substantially similar structures, although these gateways operate somewhat differently.

As described above for the client gateway 30 (FIG. 2), the form of the internal connections between the gateway components of FIG. 4 would be dependent upon the particular type of equipment in which the services network gateway 90 is implemented. Internal bus structures and/or other types of connection may be used in the services network gateway 90.

The representation of separate functional components in FIG. 4 is not intended to limit the present invention. The local services network-side functions a services network gateway may be implemented using further or fewer components than explicitly shown in FIG. 4, possibly with different interconnections. Accordingly, functions may be divided or integrated in a different manner than shown in FIG. 4. In software-based embodiments, for example, these functions may be implemented in respective software modules or combined into fewer software modules for execution by one or more processors. The functional components 96, 98, 100, 101, 102, 103, 104, as well as internal functions or components of the interfaces 92, 94, may thus be implemented as software stored in the memory 97, hardware, or partially in software and hardware.

The services network gateway interface 94 connects the services network gateway 90 to an external services network through another services network gateway. The structure and operation of the services network gateway interface 94 will be dependent upon the type of connection over which the services network gateway 90 communicates with the other services network gateway. In general, the public network interface 94 would include physical components which exchange communication signals with a communication medium, and hardware- and/or software-implemented components which generate and process the communication signals. Various implementations of such an interface will be apparent to those skilled in the art. In one embodiment, the interface 94 terminates a secure communication tunnel for a connection between the services network gateway 90 and another services network gateway. Other possible communication protocols and schemes which may be used for inter-gateway communications will be apparent to those skilled in the art.

The memory 97 may include one or more memory devices for storing information may be used by any or all of the functional components of the services network gateway 90, and thus the functional components 96, 98, 100, 101, 102, 103, 104 may access information stored in the memory 97. Although no connection between the memory 97 and the interfaces 92, 94 has been shown in FIG. 4 to avoid congestion, these interfaces or internal components thereof may also interact with the memory 97.

The policy enforcement module 96 implements services policy enforcement and a proxy service function for network services as configured by the network services members in their client profiles and advertised in their services' descriptions to the local services network. Policy enforcement for external services may be handled by gateways in the external services network, and accordingly policies for external network services might not necessarily be enforced by the services network gateway 90.

Privacy and integrity of communication traffic associated with network services may also be managed by the policy enforcement module 96. The policy enforcement module 96 may interact with the security module 98 to verify a message digital signature for example.

Other functions of the policy enforcement module 96, such as SLA monitoring and message transformations, will be apparent from the foregoing description of the substantially similar client gateway policy enforcement module 36 of FIG. 2. It should be appreciated, however, that whereas a policy enforcement module of a client gateway may perform client authentication and authorization functions in conjunction with its security module, these functions might not be provided at a services network gateway, since a services network gateway does not manage client access to a services network.

On the other hand, each services network gateway will preferably identify itself to another services network gateway and authorize traffic received from another services network gateway based on a service policy specification. However, this policy may be defined by means of inter-cooperation between the borders of two administration domains. Such a policy may specify which gateways in a services network, client gateways for example, have access to communicate to which external inter-services network gateways, the access security technology for the point-to-point pipes between these gateways (IpSec, IP VPNS, etc), the level of access to public/private services between different administrative domains, etc.

The security module 98 implements and enforces on the data traffic the security standards (specified in the policy) to guarantee the security of communications between services network gateways and in the local and external services networks. In some embodiments, the security module 98 takes care of data traffic security by using web services standards such as WS-Security, XML-Encryption/Decryption, and XML-Signature to provide secure datapaths. In general, the security module 98 provides security functions to all other modules of the services network gateway 90.

The data collector module 100 gathers real-time management and billing information, which may be processed locally and/or forwarded to a network controller or other component for further storage and processing. Once all operations are executed successfully at the policy enforcement module 96 and a security enforcement point in the security module 98, message integrity can be guaranteed within the services networks, and the data collector module 100 can pull real-time information for various management and billing operations, substantially as described above for the client gateway data collector 40 (FIG. 2). In fact, the data collector may collect real-time data from any or all modules in FIG. 4, at any of various stages in a datapath.

The SOAP proxy module 102, like the corresponding module 42 of the client gateway 30 (FIG. 2), performs SOAP header handling for incoming and outgoing messages between the services networks. The SOAP proxy module 102 is a host that has two service addresses in two network interfaces: the services network gateway interface 94 and the local services network interface 92. As far as clients of the local services network connecting to external network services through the services network gateway 90 are concerned, all external services appear to be offered from the SOAP proxy module 102.

Messages from either of the two connected services networks are addressed to the SOAP proxy module 102, which receives SOAP messages, performs such functions and modifications as header handling, and relays the messages to the appropriate processing facility, the NC proxy module 101 or the services handling module 103. Messages from the NC proxy module 101 and the service handling module 103 are also sent to the SOAP proxy module 102. Messages received from the NC proxy module 101 or the service handling module 103 may be processed by the SOAP proxy module 102 to append URI addressing information for instance. The SOAP proxy module 102 also interacts with the policy enforcement module 96 and the security module 98 to implement the network service policy on messages and then sends the messages on the appropriate interface. Policy enforcement, security, access control, auditing, and other functions associated with other modules of the services network gateway 90 may thus be triggered by the SOAP proxy module 102 for each message.

Operation of the SOAP proxy module 102 may be substantially similar to that of the SOAP proxy module 42 of the client gateway 30 shown in FIG. 2, which has been described in detail above by way of illustrative example. As will be apparent, however, whereas the SOAP proxy module of a client gateway exchanges messages between a services network and an access network, the SOAP proxy module 102 performs substantially similar functions between services networks. The address and formatting requirements between services networks may also be different than those between an access network and a services network. Thus, the SOAP proxy module 102 applies message transformations and addressing conversions in accordance with the formats and address spaces used in the different services networks.

The SOAP proxy module 102 classifies and splits incoming traffic into control traffic and data traffic. The control traffic is forwarded to the NC proxy module 101 and data traffic, illustratively XML traffic, is forwarded to the services handling module 103. In a client gateway, control traffic is normally exchanged with a network controller, whereas in a services network gateway, control traffic may be exchanged both within and outside of a local services network, to enable external publication of local network services.

A traffic classifier of the SOAP proxy module 102 may be operatively coupled to either the local services network interface 92 or to another interface which supports communications with a local network controller, to provide for exchange of control and/or management traffic with a network controller. In FIG. 4, one possible form of this connection is shown through the NC proxy module 101, which is operatively coupled to the services network gateway interface 94. It should also be appreciated that the SOAP proxy module 102 may receive control and/or management traffic from a network controller.

According to one embodiment, the NC proxy module 101 has the following architectural characteristics:

- It presents an interface, a UDDI interface for instance, to the central UDDI repository of the local designated network controller.
- When traffic coming from an external services network enters a services gateway, it passes to the local designated network controller all network services publications from the external services network registries that conform to the services network policy for offering to the services network clients.
- It also passes to the external services network, through the services network gateway interface 94, control traffic, which is generated by the local designated network controller in some embodiments, for advertising local network services into the external services network.

The advertisement control function itself may be implemented in the designated network controller, in which case this function involves exchanging control traffic between two designated network controllers of two services networks, by updating each other's registries with the corresponding external services.

Registry entries in a services network global registry for network services of a remote or external services network are marked as external. For all external services, the registry may store other information like addresses of services network exit points, i.e., the services network addresses of services network gateways through which these external network services are accessible.

The designated network controller in a services network also preferably stores in its registries the next hop towards a network service destination, which is the first hop after data traffic exits the local administrative domain. This next hop is the ingress services network gateway which is the service delivery point for the external service. This information gets downloaded to the forwarding module 104 of the services network gateway 90.

The policy enforcement module 96 may control external publication of local network services, publication of network services from an external services network into the local services network, or both, as part of the dedicated service policy specification for services gateway to services gateway communication.

Advertisement messages are preferably created by the local designated network controller for announcing internal network services outside of the local services network. An advertisement control function of a network controller may generate advertisement messages responsive to different network service events, such as at network service initialization, to provide an initial list of existing local network services to the external services network, or at runtime, new network service creation, network service update for changes in location for instance, or network service deletion. Event notifications may be provided to the services network gateway 90 by its local designated network controller.

A designated network controller with which a services network gateway communicates, although substantially similar to other network controllers which may exist in a services network, thus preferably incorporates a network services advertisement module or function for handling inter-services network publication of network services. In one possible implementation, network controller software is identical for all network controllers, but network services advertisement software supporting the inter-network functionality disclosed herein is not operational unless a network controller is configured as the designated network controller in a services network.

With reference to FIG. 3, network controllers which support inter-network offering and use of network services may include all of the interfaces 52, 54, memory 56, and functional components 60, 64, 66, 69, as well as the network services advertisement module 67 operatively coupled to the interfaces 52, 54 and to the memory 56. In a multiple-controller services network, the network services advertisement module 67, although provided in each network controller, is effectively non-operational in all but the designated network controller. Configuration of a network controller as the designated network controller for a services network may be accomplished, for example, through the management system interface 52.

As described above, the service type of each available network service may be indicated in a services network registry of a services network. A service type indication represents one mechanism by which the network service advertisement module may distinguish internal and external network services, such that only internal network services are advertised to an external services network. As a services network does not itself host providers of registered external network services, external network services are preferably not advertised to other services networks. Other techniques for distinguishing internal and external network services, based on network service provider location information for example, are also contemplated.

The NC proxy module 101 may modify the service endpoints of a local network service to force mediation of service interactions between local network services and clients of the external services network, and between local clients and external network services provided in the external services network, by the SOAP proxy 102.

The message handling capabilities of the NC proxy module 101 will be dependent upon the types of messages used for communications between designated network controllers. In one embodiment, UDDI-based messages are used between designated network controllers. Proprietary control messages are also contemplated. All messages which are not UDDI-framed, in the proprietary format, or in some other expected format, may be discarded by the NC proxy module 101.

The service handling module 103 receives service messages from the SOAP proxy module 102, handles the service messages, and sends service messages to the SOAP proxy module 102. One primary function of the service handling module 103 is to process data traffic associated with a network service and being exchanged between services networks. In one embodiment, service messages coming from the local services network through the SOAP proxy module 102 are sent to the service handling module 103, which parses and modifies the messages to adapt them to the external services network addressing and formatting rules. The service handling module 103 then sends a corresponding service message to the services network gateway associated with the external services network in which the network service is provided, through the SOAP proxy module 103 and the services network gateway interface 94.

The security module 98, the forwarding module 104, and the local services network interface 92 in the services network gateway 90 may be substantially similar to the corresponding components of a client gateway 30 in the local services network.

Security modules at communicating gateways provide communication security over a services network. Secure communications may thus be provided between client gateways, between services network gateways, or between a client gateway and a services network gateway. As will be apparent, a services network gateway and a client gateway exchange network services traffic when a network service consumer client of one services network is using a network service provided by a client of another services network.

The local services network interface 92 provides at least a physical interface to the local services network, and is compatible with services network interfaces provided at other gateways in a services network. The type and structure of the local services network interface 92, and other operations which may be performed on communication traffic which is exchanged with other gateways and a network controller in the local services network, will be services network-dependent, and many examples of such network interfaces will be apparent to those skilled in the art.

A services network gateway such as shown in FIG. 4 may be configured to allow network service provider clients of a services network to access network services available in another services network, to allow network service providers in a services network to offer their services into another services network, or both. Communication traffic is also transferred between services networks by the services network gateway.

Operation of a services network gateway may be best illustrated by considering various network service offering and use scenarios.

Through a services network gateway, a network service provided by a network service provider client of a services network may also be made available to clients of another services network. The network service provider controls availability of its network services, as described above, by establishing access control policies when publishing the network service to the services network global registry, for instance. These access control policies specify the extent to which a network service is to be made available, within a services network and/or externally in one or more other services networks. Other parameters may be specified in network service policies, and these may also be transferred between services networks for storage in a policies registry for instance and enforcement by client gateways, as described above, when clients of a services network make use of external network services.

Publishing of network services into an external services network by a services network gateway is preferably handled by the services network gateway automatically, by identifying network services in a local services network registry which are provided by clients of the services network, for example.

In a preferred central policy management model, access controls associated with network services are stored as service contexts or policies by the network controller, and downloaded to a services network gateway for enforcement, so as to control whether a local network service is advertised externally.

A network service consumer client of a services network authenticates with a client gateway in order to access the services network and its registered internal and external network services. The particular network services which a client is able to access are controlled by the policy enforcement module of the client gateway in accordance with policies established for the network services.

Data traffic which is subsequently exchanged between a local network service consumer or provider client and an external network service provider or consumer client is processed by services network gateways.

When accessing an external service, client authentication and authorization are performed only once inside the local services network, at the ingress client gateway. Once an external service appears as accessible through the local network controller, then traffic is forwarded towards its destination in the local services network, which is the services gateway specified in the services registry. From there, data traffic is distributed to the next previously learned hop, which is the ingress services gateway into the external services network. No client authentication is required while entering the second administrative domain. The client thus authenticates with the network only once, no matter whether the network is one services network or the network is composed by multiple services networks linked together through services network gateways.

With reference to FIG. 4, traffic destined from a local network service provider to an external network service consumer client is processed by the policy enforcement module 96, classified as data traffic by the SOAP proxy module 102, and processed by the SOAP proxy module 102 in collaboration with the security module 98. A resultant service message is handled by the service handling module 103, which may modify the message, the security module 98 performs security processing to apply security such as XML-level security on the modified message, and the message is routed by the forwarding module 104 through the services network gateway interface 94 to the network service consumer client, or actually to the services network gateway in the external services network to which the network service consumer client is connected. The external services network gateway then handles forwarding of the traffic to the network service consumer client through a client gateway of the external services network.

Data traffic destined for a local network service provider is processed in a substantially similar manner by the services network gateway 90. Data traffic received from an external network service consumer client of the external services network through the services network gateway interface 92 is processed by the policy enforcement module 96, classified as data traffic by the SOAP proxy module 102, and security processing is performed by the security module 98. Received data traffic destined for a local services network client is also processed by the services handling module 103, which modifies the message for adaptation to the local services network. The message is then passed to the SOAP proxy module 102, which appends local services network addressing information that is routable in the local services network. The message is then forwarded to the local services network client through the local services network by the local services network interface 92.

Communication traffic between a provider client in the external services network and a consumer client in the local services network is also handled substantially as described above.

It should be noted that the policy enforcement module of a services network gateway may enforce any or all of services network policies, service policies, and client policies. Some of these policies may be centrally managed by and downloaded from a network controller. The policy enforcement module restricts external availability of local network services.

Auditing of network service-related transactions by a services network gateway may be useful for billing consumers for use of network services, whether the consumers are clients of the local services network or an external services network. Although clients of the same services network may already have an established business relationship, there might not be an existing relationship between all clients of local and remote services networks. Auditing of inter-services network transactions might thus be particularly important where a network services are offered between different services networks, to allow tracking and billing of network service activities. As noted above, audit records may also or instead be used by a gateway, a network controller, or another system for other purposes than billing.

Figure 5:
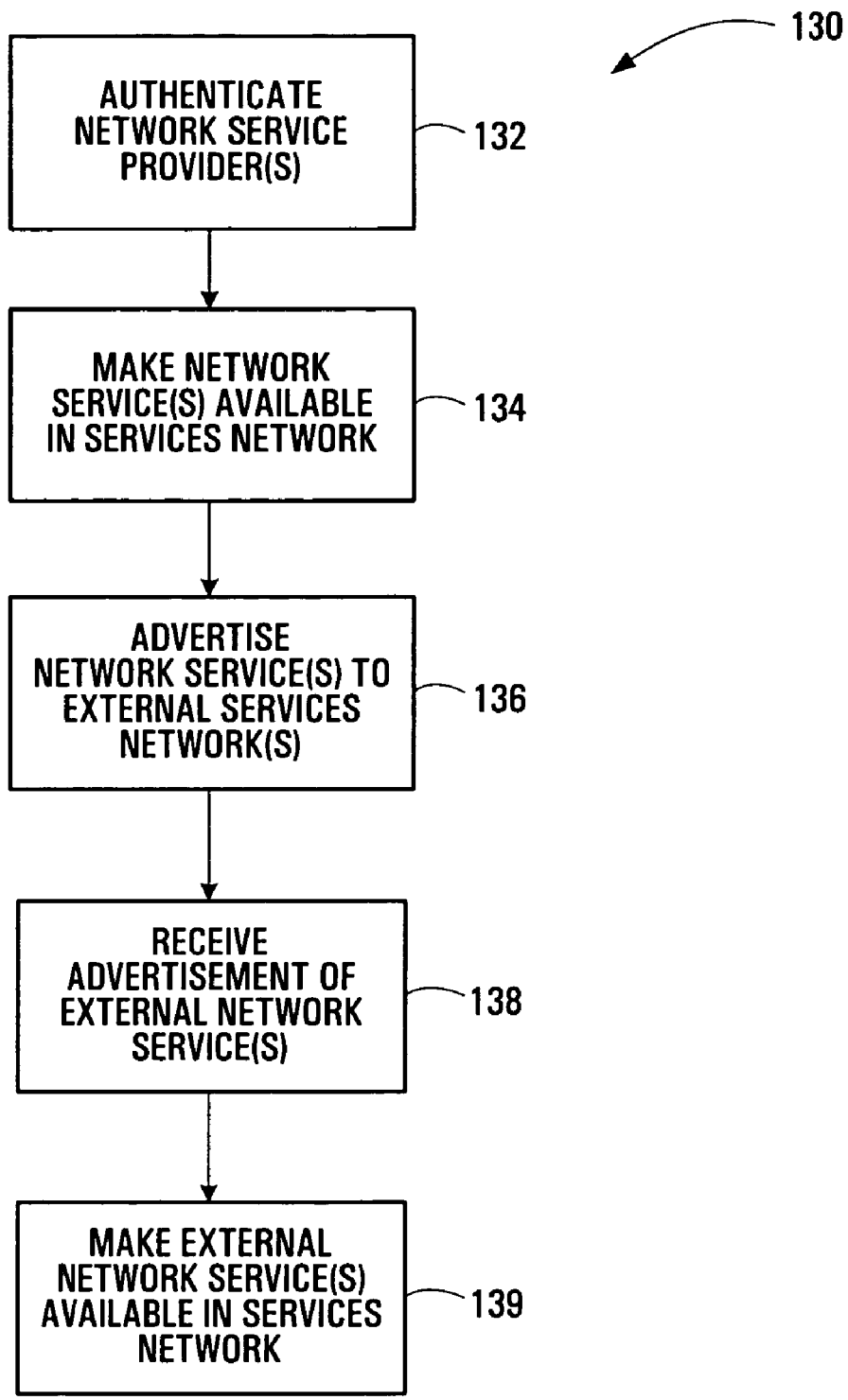
FIG. 5 is a flow diagram of a method according to an embodiment of the invention.

Embodiments of the invention have been described above primarily in terms of communication network equipment, namely the client gateway, the network controller, and the services network gateway. FIG. 5 is a flow diagram of a method according to an embodiment of the invention.

The method 130 begins at 132 with an operation of authenticating clients of a services network, in this case one or more network service provider(s). As network service providers are authenticated, network services which they provide are made available in the services network at 134. These operations are performed at a client gateway.

At 136, available network services are advertised to an external services network by a services network gateway, and possibly to multiple services networks by respective services network gateways, on the basis of their policies, and thereby made available in the external services network(s). The operation at 136 may be performed for each network service as it is added to the services network, at predetermined intervals as batches of advertisements messages, or responsive to explicit requests by a local network service provider or consumer, a local network controller, or an external services network gateway. In some embodiments, a services network gateway enforces the access control policy of each network service when it is first registered in the services network, and publishes each network service externally in accordance with its policy. Those skilled in the art will appreciate that XML routing within a services network may be useful for distributing event notifications, to alert services network gateways when a new network service has been registered for instance.

The operations at 138 and 139 reflect the importing of external network services from an external services network into a local services network. At 138, external network service information, illustratively in the form of an advertisement, is received from an external network, and the external network services are made available in the local services network. The received network service information preferably also includes access policies which are enforced by client gateways to control access to the external network services.

The method 130 as shown in FIG. 5 is intended solely for illustrative purposes. Various manners of performing the operations shown in FIG. 5, as well as other operations which may be performed, will be apparent from the foregoing. The illustrated operations may also be repeated periodically, repeated for multiple network services, performed in a different order, and/or divided or combined differently than shown.

Services network gateway functions as disclosed herein support offering and consumption of network services between private services networks or extranet services.

What has been described is merely illustrative of the application of principles of the invention. Other arrangements and methods can be implemented by those skilled in the art without departing from the scope of the present invention.

Figure 6:
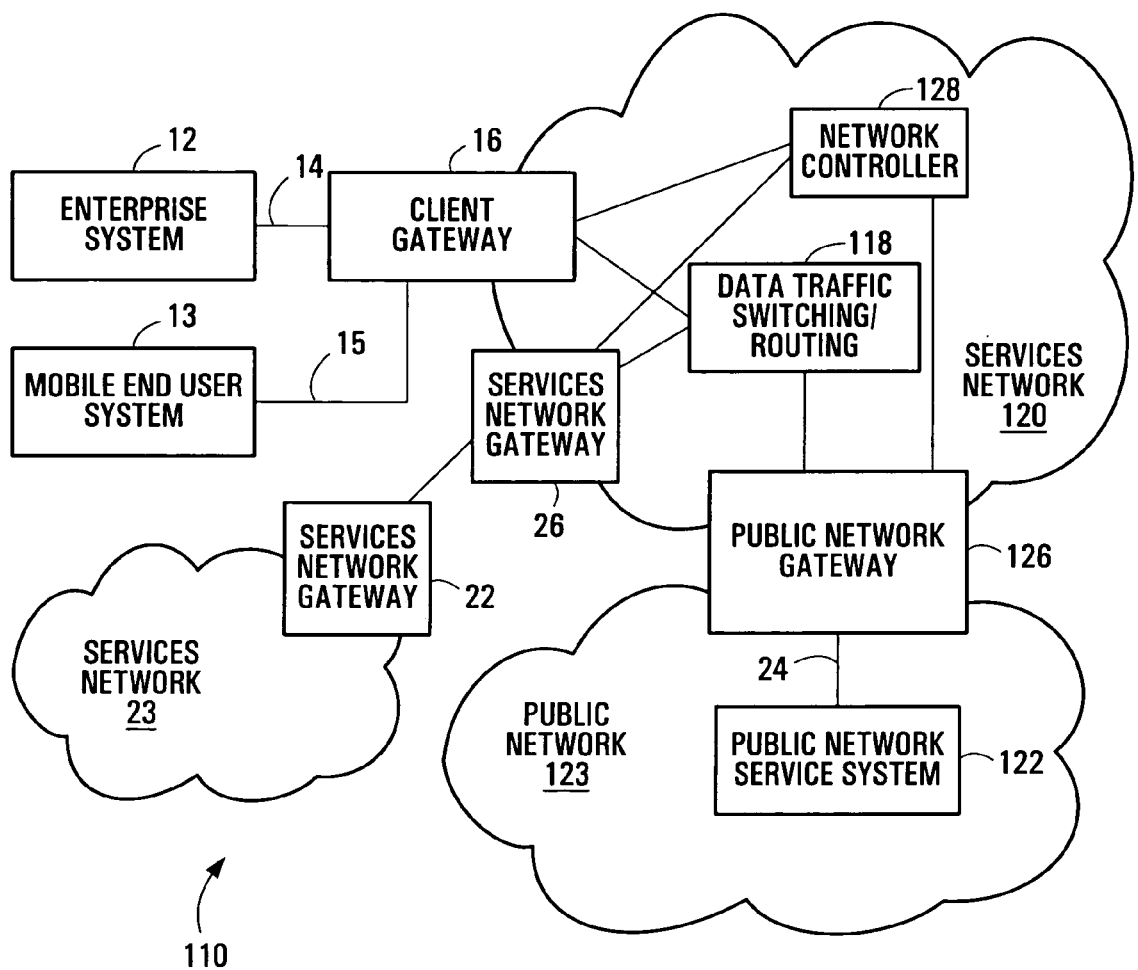
FIG. 6 is a block diagram of a communication system incorporating a further embodiment of the invention.

For example, a services network may include components other than those shown in FIG. 1. As shown in FIG. 6, a communication system 110 in accordance with another embodiment of the invention includes a services network 120 with a network controller 128 and data traffic switching/routing components 118 which operate in conjunction with a client gateway 16, a services network gateway 26, and a public network gateway 126.

The components of FIG. 6 operate in substantially the same manner as similarly labelled components of FIG. 1. In FIG. 6, however, the services network 120 includes a public network gateway which provides an access point into the services network 120 for clients of the services network 120 in the public network 123. One possible application of the public network gateway 126 would be to provide access to the services network 120 for a mobile services network client. In the system 110, a mobile client may normally connect to the services network 120 through the enterprise system 12 and the client gateway such as 16, and still gain access to the services network 120 from outside the enterprise system 12 through the public network 123 and the public network gateway 126.

The public network gateway is effectively a public network counterpart of the client gateway 16, and may thus be substantially similar to the client gateway 16 in structure and operation, although the public network gateway would interface the services network 120 with the public network 123 instead of a client access network. Through the public network gateway 126, a network service system 122 which is also a client of the services network 120 may make its network services available in the services network 120, consume network services which are available in the services network 120, or both. Network services supported by the network service system 122 may include public network services which are provided to users in the public network 123, and/or private network services which are made available only to users within the system 122.

Network service-related functions of the public network gateway 126, including network service publication, client authentication, monitoring and auditing, and other functions, may be performed substantially as described above for the client gateway 16 and in some cases the services network gateway 26. The public network gateway 126 authenticates and authorizes clients for access to the services network 120 to publish and use network services, like the client gateway 16, and may also publish services from public registries into the services network 120 and handle inter-network traffic in a manner substantially as described above for the services network gateway 26.

Details of the public network gateway 126 are disclosed in the related application, referenced above.

Although only a single network controller is explicitly shown in the services network 120, multiple network controllers may exist in a services network. In this case, as noted above, any services network gateways preferably communicate with a designated one of the network controllers. Other gateways, including the client gateway 16 and the public network gateway 126, may communicate with the designated network controller or another network controller.

The example gateway and network controller components shown in FIGS. 2 through 4 are similarly not restrictive. Embodiments of the invention may include fewer or additional components. A management system which communicates with a network controller may also communicate with gateways for instance, even though no management system interface was shown in the example gateways 30 and 90 of FIGS. 2 and 4 to avoid congestion. Functions of multiple gateways may also be combined into a single gateway. A services network could be enhanced with a client gateway component for instance, to become a network service delivery point for clients of a local and/or external services network.

Services network clients have been described primarily herein as enterprise clients, but need not necessarily be associated with an enterprise. Embodiments of the invention may be implemented in conjunction with non-enterprise services network clients.

Embodiments of the invention are independent of any particular registry format or content. In many cases, addresses or locations of network service provider clients of a services network are fixed, and accordingly these addresses or locations may be stored in a network service registry. Network addresses or locations of external network service providers are not under the control of (or in the same domain as) a local services network and may thus be more likely to change.

In addition, although described primarily in the context of methods and systems, other implementations of the invention are also contemplated, as instructions stored on a machine-readable medium for instance.

We claim:

1. An apparatus for managing network services in a private services network, the apparatus comprising:

a services network interface configured to enable communications between the apparatus and the private services network, the private services network allowing a first network service which is provided to users within a first private network service provider system, which is also a client of the private services network, to be made available for use by another client of the private services network outside the first private network service provider system;

a services network gateway interface to be operatively coupled to a services network gateway that is configured to exchange communication traffic with an external private services network, the external private services network allowing a second network service which is provided to users within a second private network service provider system which is also a client of the external private services network to be made available for use by another client of the external private services network outside the second private network service provider system; and a proxy module operatively coupled to the services network interface and to the services network gateway interface and configured to receive through the services network interface network service information for the first network service, the first network service having an associated network service access policy specifying a permitted access level for distribution of the first network service in the external private services network, and to control advertisement of the network service information to the external private services network in accordance with the network service access policy associated with the first network service.

2. The apparatus of claim 1, wherein the access policy comprises a service policy stored in a service policies registry of the private services network.

3. The apparatus of claim 1, wherein the proxy module is further configured to receive, from the external services network, network service information associated with the second network service, and to make the second network service available in the services network.

4. The apparatus of claim 3, wherein the proxy module is configured to make the second network service available in the services network by publishing the second network service in a services registry of the services network.

5. The apparatus of claim 4, wherein the services registry is configured to store information associated with network services, including the first network service, which are available in the services network and external network services, including the second network service, which are available from the external services network.

6. The apparatus of claim 3, wherein the network service information associated with the second network service comprises access information specifying access rules for controlling access to the second network service, and wherein the proxy module makes the second network service available in the services network in accordance with the access rules.

7. The apparatus of claim 1, wherein the proxy module comprises a network controller proxy module configured to receive the network service information from a network services advertisement module comprising a network controller of the services network, and to control advertisement of the first network service by mediating advertisement in the services network of a network service description for the first network service, and further configured to receive from the external services network, through the services network gateway interface, and forward to the network controller, through the services network interface, network service information associated with the second network service.

8. The apparatus of claim 1, further comprising at least one of:
a policy enforcement module configured to enforce policies of the services network;
a security module configured to provide secure communication between the services network and the external services network, and within the services network;
a forwarding module configured to forward communication traffic from the services network to the external services network;
a Simple Object Access Protocol (SOAP) proxy module configured to adapt service messages associated with network services between addressing schemes of the services network and the external services network;
a service handling module configured to handle network service messages, associated with network services, from both the services network and the external services network; and
a data collector module for collecting logs of transactions between the services network and the external services network.

9. The apparatus of claim 8, wherein the SOAP proxy module is further configured to classify traffic associated with network services as control traffic or data traffic, to transmit control traffic comprising the received network service information to the proxy module for transfer to the external services network, and to modify SOAP information in data traffic for further processing.

10. A system for managing network services of a private services network, the system comprising:
at least one services network gateway operatively coupled to the services network and to a respective external services network, each of the at least one services network gateway comprising the apparatus of claim 1; and
at least one network controller, the at least one network controller comprising a designated network controller operatively coupled to the at least one services network gateway for managing network service access policies associated with network services available in the services network and a registry of network services available in the services network.

11. The system of claim 10, wherein the designated network controller comprises a network services advertisement module configured to identify network services which are available in the services network and have associated network service access policies permitting distribution of the network services in external networks, and to generate advertisement information comprising network service information associated with the identified network services.

12. The system of claim 10, wherein each external services network comprises a services registry into which network services advertised to the external services network from the services network are published.

13. The system of claim 10, wherein the proxy module of each services network gateway is further configured to receive from the external services network to which it is operatively coupled through the services network gateway interface, network service information associated with external network services available in the external services network, and to make the external network services available in the services network.

14. The system of claim 10, further comprising at least one of:
a client gateway operatively coupled to one of the at least one network controller and to the services network for providing an access point to the services network for a client of the services network, the network controller to which the client gateway is operatively coupled managing policies to be enforced by the client gateway for controlling client access to the external services network and network services; and a public network gateway operatively coupled to the services network and to a public network for providing an access point to the services network for a client of the services network through the public network, an access point to network services in the public network for a client of the services network, or both.

15. The system of claim 10,
wherein each of the external services networks comprises:
at least one services network gateway comprising the apparatus of claim 1 and operatively coupled to the external services network and to a respective services network gateway of the services network;
at least one network controller, the at least one network controller comprising a designated network controller operatively coupled to each services network gateway for managing network service access policies associated with network services available in the services network, and a registry of network services available in the services network; and
at least one of:
a client gateway operatively coupled to one of the at least one network controller and to the external services network for providing an access point to the external services network for a client of the external services network, the network controller to which the client gateway is operatively coupled managing policies to be enforced by the client gateway for controlling client access to the external services network and network services; and
a public network gateway operatively coupled to one of the at least one network controller, to the external services network and to a respective public network for providing an access point to the external services network for a respective group of clients of the external services network through the public network, an access point to network services in the public network for clients of the external services network, or both, the network controller to which the public network gateway is operatively coupled managing policies to be enforced by the public network gateway for controlling client access to the external services network and network services through the public network.

16. An apparatus for managing network services in a private services network, the apparatus comprising:
a services network interface configured to enable communications between the apparatus and the private services network, the private services network allowing a first network service which is provided to users within a first private network service provider system, which is also a client of the private services network, to be made available for use by another client of the private services network outside the first private network service provider system;
a services network gateway interface to be operatively coupled to a services network gateway that is configured to exchange communication traffic with an external private services network, the external private services network allowing a second network service which is provided to users within a second private network service provider system which is also a client of the external private services network to be made available for use by another client of the external private services network outside the second private network service provider system; and
a proxy module configured to receive, from the external services network and through the services network gateway interface, network service information associated with the second network service, and to make the second network service available in the services network.

17. The apparatus of claim 16, wherein the proxy module is configured to make the second network service available in the services network by publishing the second network service in a services registry of the services network, the services registry being configured to store information associated with network services, including the first network service, which are available in the services network and external network services, including the second network service, which are available from the external services network.

18. A system for managing network services of a private services network, the system comprising:
at least one services network gateway operatively coupled to the services network and to a respective external services network, each of the at least one services network gateway comprising the apparatus of claim 16; and
at least one network controller, at least one network controller comprising a designated network controller operatively coupled to each of the at least one services network gateway for managing a registry of network services available in the services network and external network services available in the at least one external services network for which information is received by a services network gateway.

19. An apparatus for managing network services in a private services network, the apparatus comprising:
a gateway interface to be operatively coupled to a services network gateway configured to exchange communication traffic between the services network and an external services network; and
a network service advertisement module, operatively coupled to a services registry and to the gateway interface, and configured to receive from the services network gateway through the gateway interface external network service information associated with a network service available in the external services network, to publish the external network service to the services registry, to identify a network service which is available in the services network and has an associated network service access policy permitting distribution of the network service in the external services network, and to generate and forward to the services network gateway through the gateway interface advertisement information associated with the identified network service, the advertisement information comprising information for advertising the identified network service to the external services network.

20. A system for managing a private services network in which network services provided by network service provider clients of the services network are made accessible to network service consumer clients of the services network, the system comprising:
at least one services network gateway to be operatively coupled to a respective external services network; and
at least one network controller, the at least one network controller comprising a designated network controller operatively coupled to each of the at least one services network gateway and comprising the apparatus of claim 19, each of the at least one services network gateway mediating advertisement of network services of the services network to the external services network to which it is to be operatively coupled.

21. A method of managing network services between private services networks, the method comprising:
  identifying a network service available in a services network, the network service having an associated network service access policy specifying a permitted access level of the network service;
  advertising the identified network service to an external services network where the network service access policy associated with the identified network service allows access to the identified network service from the external services network;
  receiving, from an external services network, network service information associated with an external network service available in the external services network; and
  making the external network service available in the services network.

22. The method of claim 21, wherein the access policy comprises a service policy stored in a service policies registry of the services network, further comprising:
  accessing the network service access policy associated with the identified network service in the service policies registry.

23. The method of claim 21, wherein making comprises publishing the external network service in a services registry of the services network.

24. The method of claim 21, wherein identifying comprises accessing a services registry of the services network to identify a network service available in the services network, and wherein making comprises publishing the external network service in the services registry.

25. A computer-readable medium storing instructions which when executed perform the method of claim 21.

* * * * *